United States Patent
Nakai et al.

(10) Patent No.: US 7,161,314 B2
(45) Date of Patent: Jan. 9, 2007

(54) MOTOR CONTROL APPARATUS HAVING CURRENT SUPPLY PHASE CORRECTION

(75) Inventors: Yasuhiro Nakai, Kariya (JP); Shigeru Kamio, Nagoya (JP)

(73) Assignee: Denso Corporation, Kariya (JP)

( * ) Notice: Subject to any disclaimer, the term of this patent is extended or adjusted under 35 U.S.C. 154(b) by 86 days.

(21) Appl. No.: 10/674,472

(22) Filed: Oct. 1, 2003

(65) Prior Publication Data

US 2004/0066166 A1   Apr. 8, 2004

Related U.S. Application Data

(62) Division of application No. 09/315,574, filed on May 20, 1999, now Pat. No. 6,512,097, which is a division of application No. 08/665,202, filed on Jun. 13, 1996, now Pat. No. 5,977,322.

(60) Provisional application No. 60/000,238, filed on Jun. 14, 1995, provisional application No. 60/000,250, filed on Jun. 15, 1995.

(30) Foreign Application Priority Data

Oct. 7, 2002   (JP)   ............................. 2002-293271
Dec. 13, 2002  (JP)   ............................. 2002-362617

(51) Int. Cl.
*H02P 1/18*   (2006.01)
*H02P 3/08*   (2006.01)
*H02P 7/06*   (2006.01)

(52) U.S. Cl. .................. 318/254; 318/430; 318/431; 318/721

(58) Field of Classification Search ............ 318/138, 318/254, 430, 431, 439, 700, 701, 720, 721, 318/722
See application file for complete search history.

(56) References Cited

U.S. PATENT DOCUMENTS

| | | | | | |
|---|---|---|---|---|---|
| 4,147,396 | A | * | 4/1979 | Lyman | 310/90.5 |
| 4,678,401 | A | * | 7/1987 | Bradford et al. | 416/32 |
| 4,698,537 | A | * | 10/1987 | Byrne et al. | 318/138 |
| 4,772,839 | A | * | 9/1988 | MacMinn et al. | 318/696 |
| 4,911,031 | A | * | 3/1990 | Yoshimura et al. | 74/335 |
| 5,140,243 | A | * | 8/1992 | Lyons et al. | 318/701 |
| 5,325,029 | A | * | 6/1994 | Janecke et al. | 318/561 |
| 5,446,354 | A | * | 8/1995 | Hiruma | 318/439 |
| 5,467,001 | A | * | 11/1995 | Iwashita | 318/434 |
| 5,481,170 | A | * | 1/1996 | Edelen et al. | 318/650 |
| 5,619,109 | A | * | 4/1997 | Cameron et al. | 318/375 |
| 5,737,164 | A | * | 4/1998 | Ferreira et al. | 361/31 |

(Continued)

FOREIGN PATENT DOCUMENTS

JP   03-124284 A   5/1991

(Continued)

*Primary Examiner*—Lincoln Donovan
*Assistant Examiner*—Eduardo Colon Santana
(74) *Attorney, Agent, or Firm*—Nixon & Vanderhye, P.C.

(57) ABSTRACT

In a motor-driven shift position switching device, when the difference between a target position and the rotation position of a rotor has become smaller than a prescribed value in a motor feedback control, a transition is made to a deceleration control. A phase lead correction amount for correcting the phase lead of the current supply phase with respect to the rotor rotation phase is set in accordance with the rotor rotation speed. Thus, proper braking force suitable for the rotor rotation speed is exerted on the rotor and the rotor can be decelerated smoothly as it approaches the target position. Further, in the period when the current supply to the motor is kept off, the shift position switching determination ranges are set wider than in the period when the current supply to the motor is on.

12 Claims, 29 Drawing Sheets

U.S. PATENT DOCUMENTS

| | | | |
|---|---|---|---|
| 5,844,343 A * | 12/1998 | Horst | 310/184 |
| 5,949,211 A * | 9/1999 | McCann | 318/701 |
| 6,105,448 A * | 8/2000 | Borschert et al. | 74/335 |
| 6,150,778 A * | 11/2000 | Morris | 318/254 |
| 6,359,413 B1 * | 3/2002 | Schulz et al. | 318/701 |
| 6,389,916 B1 * | 5/2002 | Fukuda | 74/335 |
| 6,448,736 B1 * | 9/2002 | Lajsner et al. | 318/701 |
| 6,477,910 B1 * | 11/2002 | Ebashi et al. | 74/335 |
| 6,653,811 B1 * | 11/2003 | Branecky | 318/701 |
| 2003/0042864 A1 * | 3/2003 | Lequesne et al. | 318/701 |
| 2004/0066165 A1 * | 4/2004 | Kamio et al. | 318/701 |

FOREIGN PATENT DOCUMENTS

| | | |
|---|---|---|
| JP | 2001-271917 | 10/2001 |
| JP | 2002-286128 A | 10/2002 |

* cited by examiner

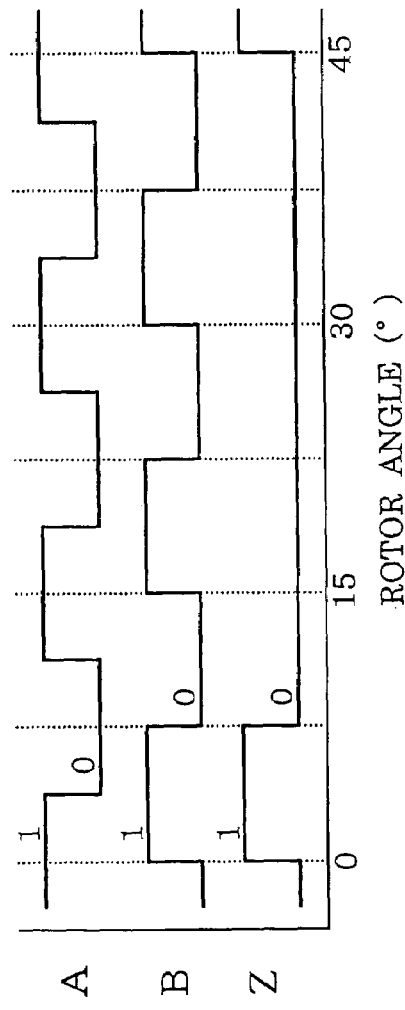
FIG. 7A  (NON-P-POSITION→P-POSITION)
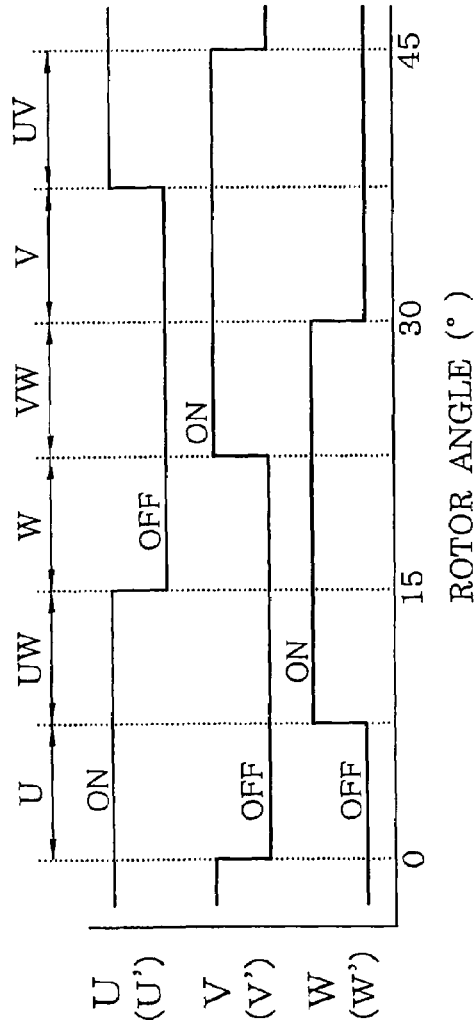
FIG. 7B  (NON-P-POSITION→P-POSITION)

| B (i) | A (i) | B (i-1) | A (i-1) | ΔN |
|---|---|---|---|---|
| 0 | 1 | 0 | 0 | -1 |
| 1 | 0 | 0 | 0 | +1 |
| 0 | 0 | 0 | 0 | 0 |
| 1 | 1 | 0 | 0 | 0 |
| 1 | 1 | 0 | 1 | -1 |
| 0 | 0 | 0 | 1 | +1 |
| 0 | 1 | 0 | 1 | 0 |
| 1 | 0 | 0 | 1 | 0 |
| 0 | 0 | 1 | 0 | -1 |
| 1 | 1 | 1 | 0 | +1 |
| 1 | 0 | 1 | 0 | 0 |
| 0 | 1 | 1 | 0 | 0 |
| 1 | 0 | 1 | 1 | -1 |
| 0 | 1 | 1 | 1 | +1 |
| 1 | 1 | 1 | 1 | 0 |
| 0 | 0 | 1 | 1 | 0 |

| Mptn%12 | 0 | 1 | 2 | 3 | 4 | 5 | 6 | 7 | 8 | 9 | 10 | 11 |
|---|---|---|---|---|---|---|---|---|---|---|---|---|
| CURRENT SUPPLY | VW | VW | W | W | UW | UW | U | U | UV | UV | V | V |

$\Delta Gnp = \Delta Gp = (\Delta Nact - \Delta Nd) / 2$

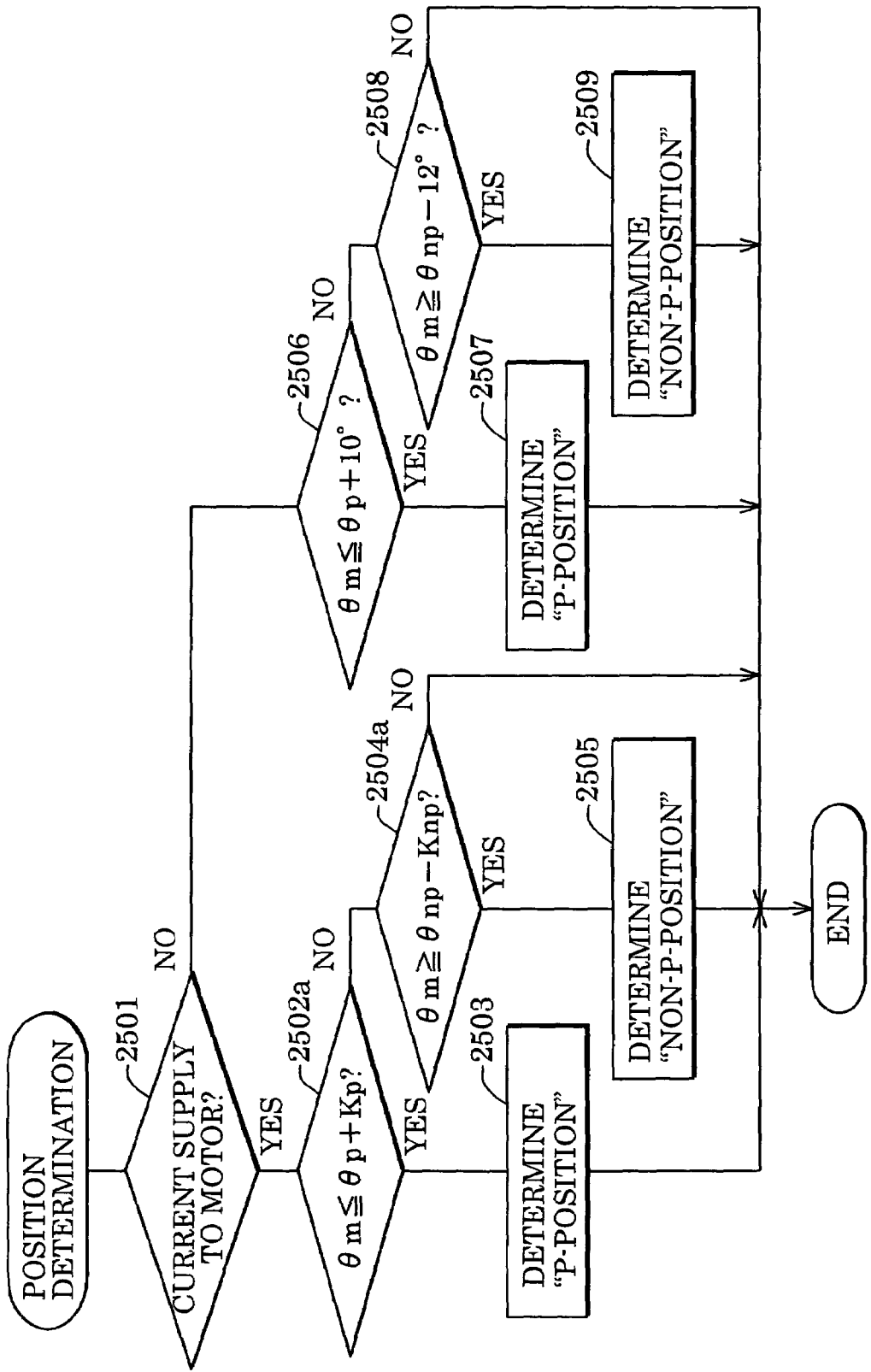

MOTOR CONTROL APPARATUS HAVING CURRENT SUPPLY PHASE CORRECTION

CROSS REFERENCE TO RELATED APPLICATION

This application is a divisional of U.S. Ser. No. 09/315,574, filed on May 20, 1999, now Pat. No: 6,512,097, which is a Divisional of U.S. Ser. No. 08/665,202 filed on Jun. 13, 1996, now U.S. Pat. No. 5,977,322, which is a continuation-in-part of U.S. Provisional Applications U.S. Ser. No. 60/000,238 and U.S. Ser. No. 60/000,250, filed on Jun. 14, 1995 and Jun. 15, 1995 respectively. These applications are incorporated by reference for all purposes.

FIELD OF THE INVENTION

The present invention relates to a motor control apparatus for rotationally driving (rotating) the rotor of a motor to a target position by detecting the rotation position of the rotor on the basis of the count of a pulse signal of an encoder and sequentially switching the current supply phase of the motor. In particular, the invention relates to a position switching controller for switching the manipulated position of a position switching mechanism to a target position by driving the position switching mechanism with a motor.

BACKGROUND OF THE INVENTION

Brushless motors such as switched reluctance motors are increasingly demanded because they are inexpensive and simple in structure. Those motors incorporate an encoder for outputting a pulse signal in synchronism with the rotation of the rotor, which is rotated by sequentially switching the current supply phase by counting pulses of a pulse signal of the encoder and detecting the rotation position of the rotor on the basis of the encoder count. Since it is possible to detect the rotation position of the rotor on the basis of the encoder count after starting, motors of this type having an encoder are used as drive sources of various position switching devices in which a position switching control (positioning control) for rotating the rotor to a target position by means of a feedback control system to, for example, switch the position of an automatic transmission of a vehicle is performed (JP-A-2001-271917).

In such a motor incorporating an encoder, a feedback control is performed in such a manner that the rotor is rotated toward a target position by switching the current supply phase on the basis of the encoder count in synchronism with pulses of a pulse signal of the encoder. When the encoder count has reached a target count that is set in accordance with the target position, the feedback control is finished with a determination that the rotor has reached the target position. The rotor is stopped at the target position.

Here, to generate torque for rotating the rotor, the phase of the current supply phase needs to lead the rotation phase of the rotor. The rotor rotation speed can be made high by increasing the phase lead of the current supply phase in such a manner as not to cause loss of synchronization. However, if the rotor rotation speed in a feedback control is increased, because of its inertia the rotor tends to overshoot a target position after the end of the feedback control: it is difficult to stop the rotor correctly at the target position.

Further, in a system that performs a feedback control for rotating the rotor to a target position on the basis of the encoder count, a failure of the feedback control system or an abnormality (e.g., noise, loss of a pulse, or a disconnection of a signal line) in output pulses of the encoder may cause loss of synchronization between the current supply phase (i.e., encoder count) and the rotation phase of the rotor, which may lead to a situation that the rotor cannot be driven normally or is rendered out of control.

One countermeasure is as follows. When a situation that the motor cannot be feedback-controlled normally has occurred, switching is made from the feedback control to a fail-safe control (i.e., open-loop control). The current supply phase of the motor is switched sequentially by supplying a drive signal to a motor drive circuit without feeding back encoder count information. Pulses of the drive signal are counted and the rotor is rotated to a target position on the basis of resulting counts.

However, during the fail-safe control, the rotor rotation angle (i.e., the manipulated variable of a position switching mechanism) is merely estimated on the basis of the count of the drive signal. Therefore, the actual rotor rotation angle may deviate from the estimated value. As a result, the shift position of an automatic transmission of a vehicle may be determined erroneously during the fail-safe control.

SUMMARY OF THE INVENTION

It is a first object of the present invention to provide a motor control apparatus which can stop the rotor correctly at a target position at the end of a feedback control even if the rotor rotation speed in the feedback control is set high, and which can increase both of the rotor rotation speed in a feedback control and the rotor stop position accuracy.

To attain the first object, the invention provides a motor control apparatus which corrects the phase lead of the current supply phase with respect to the rotation phase of the rotor in accordance with the rotation speed of the rotor during a rotor deceleration control. With this measure, during a rotor deceleration control, proper braking force suitable for the rotor rotation speed is exerted on the rotor, whereby the rotor can be decelerated reliably as it approaches a target position. As a result, the rotor is prevented from overshooting the target position because of its inertia at the end of a feedback control and hence can be stopped accurately at the target position. Both of the rotation speed of the rotor in a feedback control and its stop position accuracy can be increased.

It is a second object of the invention to provide a position switching controller capable of reducing the probability that a manipulated position (e.g., a shift range of a range switching mechanism) of a position switching mechanism is determined erroneously even without providing a sensor or the like for detecting a manipulated variable of the position switching mechanism.

To attain the second object, the invention provides a position switching controller which detects a rotor rotation angle of a motor, determines, on the basis of a resulting detection value, whether a manipulated position of a position switching mechanism is within a switching determination range for a target position, and making the switching determination range wider in the period when the current supply to the motor is kept off than in the period when the current supply to the motor is on.

BRIEF DESCRIPTION OF THE DRAWINGS

The above and other objects, features and advantages of the present invention will become more apparent from the following detailed description made with reference to the accompanying drawings. In the drawings:

FIG. 7A is a time chart showing output waveforms of the encoder;

FIG. 7B is a time chart showing a current supply phase switching pattern;

FIG. 35 is a flowchart of a position determination routine according to the third embodiment.

DESCRIPTION OF THE PREFERRED EMBODIMENTS (First Embodiment)

A first embodiment in which the present invention is applied to a position switching device of an automatic transmission of a vehicle will be described in detail.

Figure 1:
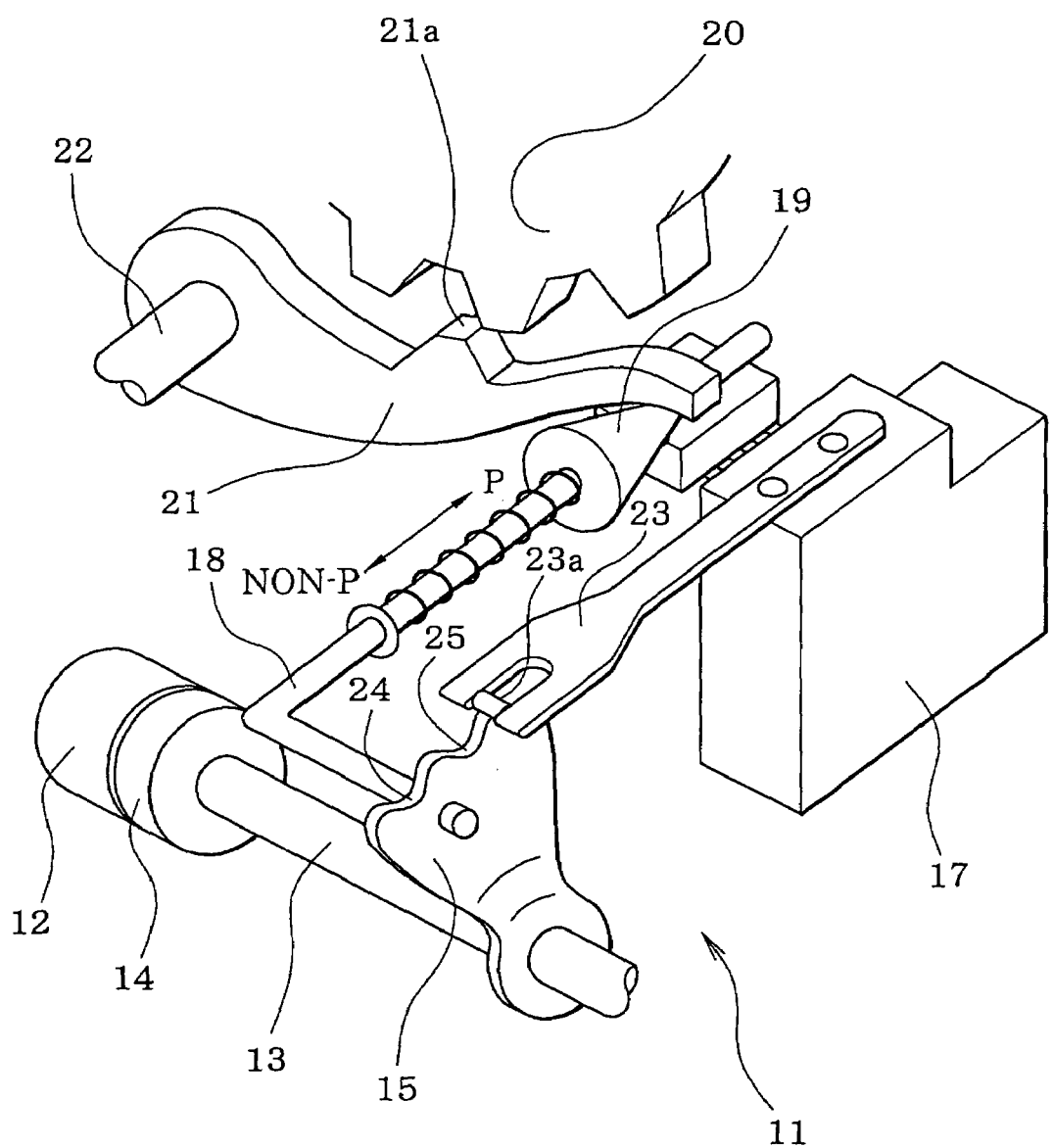
FIG. 1 is a perspective view of a position switching device according to a first embodiment of the invention.

Referring first to FIG. 1, a position switching mechanism 11 is indicated with numeral 11. A motor 12 as a drive source of the position switching mechanism 11 is a switched reluctance motor, for example, incorporates a speed reducing mechanism 26 (FIG. 4), and is equipped with an output shaft sensor 14 for detecting a rotation position of an output shaft 13 of the speed reducing mechanism 26. A detent lever 15 is fixed to the output shaft 13.

Figure 4:
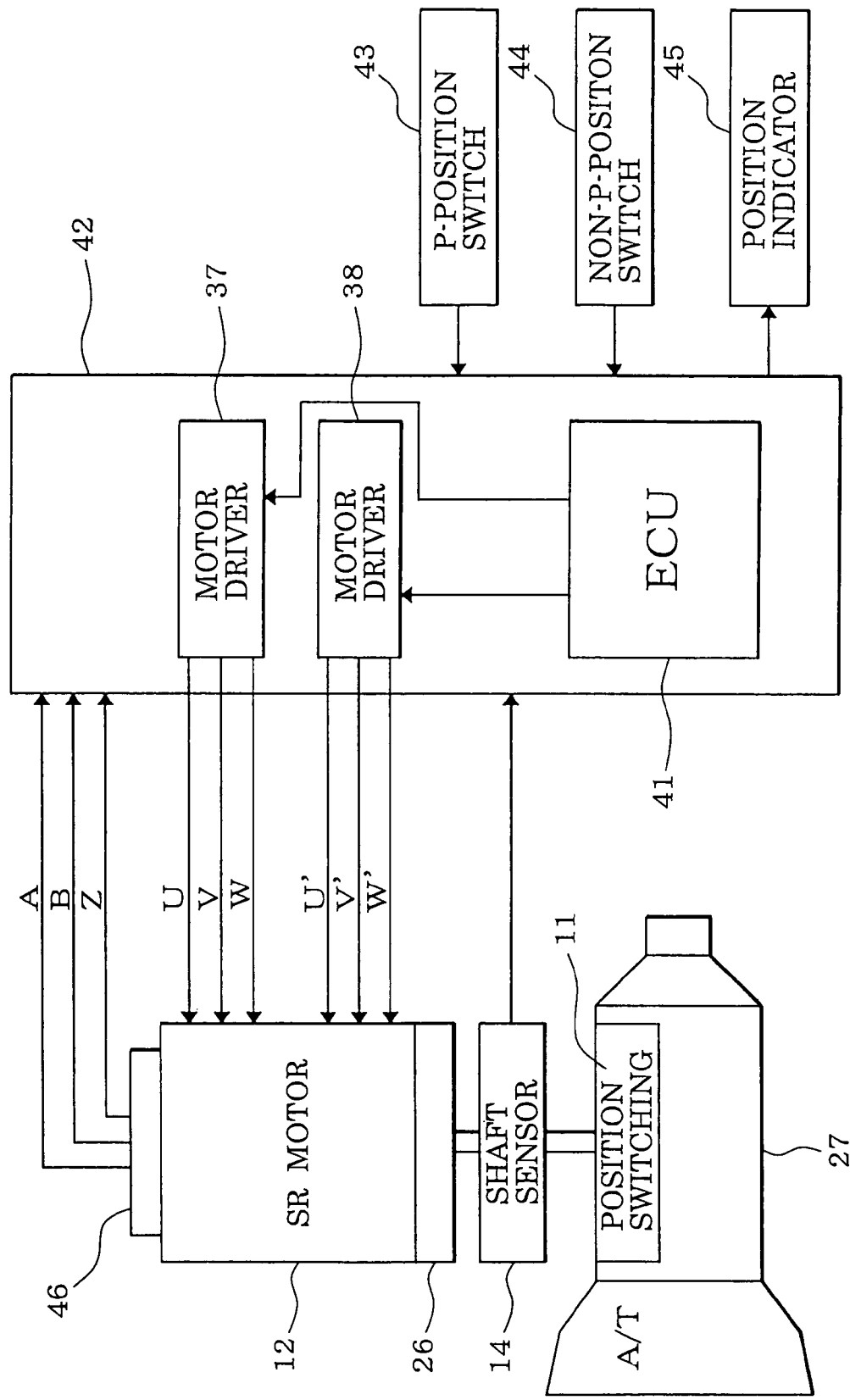
FIG. 4 schematically shows the entire configuration of a control system of the position switching device.

An L-shaped parking rod 18 is fixed to the detent lever 15. A conical body 19 that is provided at the tip of the parking rod 18 is in contact with a lock lever 21. The lock lever 21 is moved in the vertical direction in accordance with the position of the conical body 19 and thereby locks or unlocks a parking gear 20. The parking gear 20 is attached to the output shaft of an automatic transmission 27 (FIG. 4). If the parking gear 20 is locked by the lock lever 21, the drive wheels of the vehicle are kept in a rotation-prevented state (i.e., a parking state).

On the other hand, a detent spring 23 for keeping the detent lever 15 at the position of a parking position (hereinafter abbreviated as "P-position") or the other range (hereinafter referred to as "non-P-position") is fixed to a support base 17. The detent lever 15 is kept at the P-position when an engaging portion 23a that is provided at the tip of the detent spring 23 moves into a P-position holding recess 24 of the detent lever 15. The detent lever 15 is kept at the non-P-position when the engaging portion 23a of the detent spring 23 moves into a non-P-position holding recess 25 of the detent lever 15.

In the P-position, the parking rod 18 is moved in such a direction as to approach the lock lever 21, whereby a thick portion of the conical body 19 lifts up the lock lever 21 and a projection 21a of the lock lever 21 moves into a tooth space of the parking gear 20 to lock it. As a result, the output shaft of the automatic transmission 27 (and the drive wheels) is kept in a locked state (i.e., a parking state).

On the other hand, in the non-P-position, the parking rod 18 is moved in such a direction as to move away from the lock lever 21, whereby the thick portion of the conical body 19 moves out of contact with the lock lever 21 and hence the lock lever 21 moves down. As a result, the projection 21a of the lock lever 21 disengages from the parking gear 20 and hence the parking gear 20 is unlocked. The output shaft of the automatic transmission 27 is kept in a rotatable state (i.e., a state that the vehicle is capable of running).

The output shaft sensor 14 is a rotary sensor (e.g., a potentiometer) for outputting a voltage corresponding to a rotation angle of the output shaft 13 of the speed reducing mechanism 26 of the motor 12. Whether the current shift range (position) is the P-position or the non-P-position can be recognized on the basis of the output voltage of the output shaft sensor 14.

Figure 2:
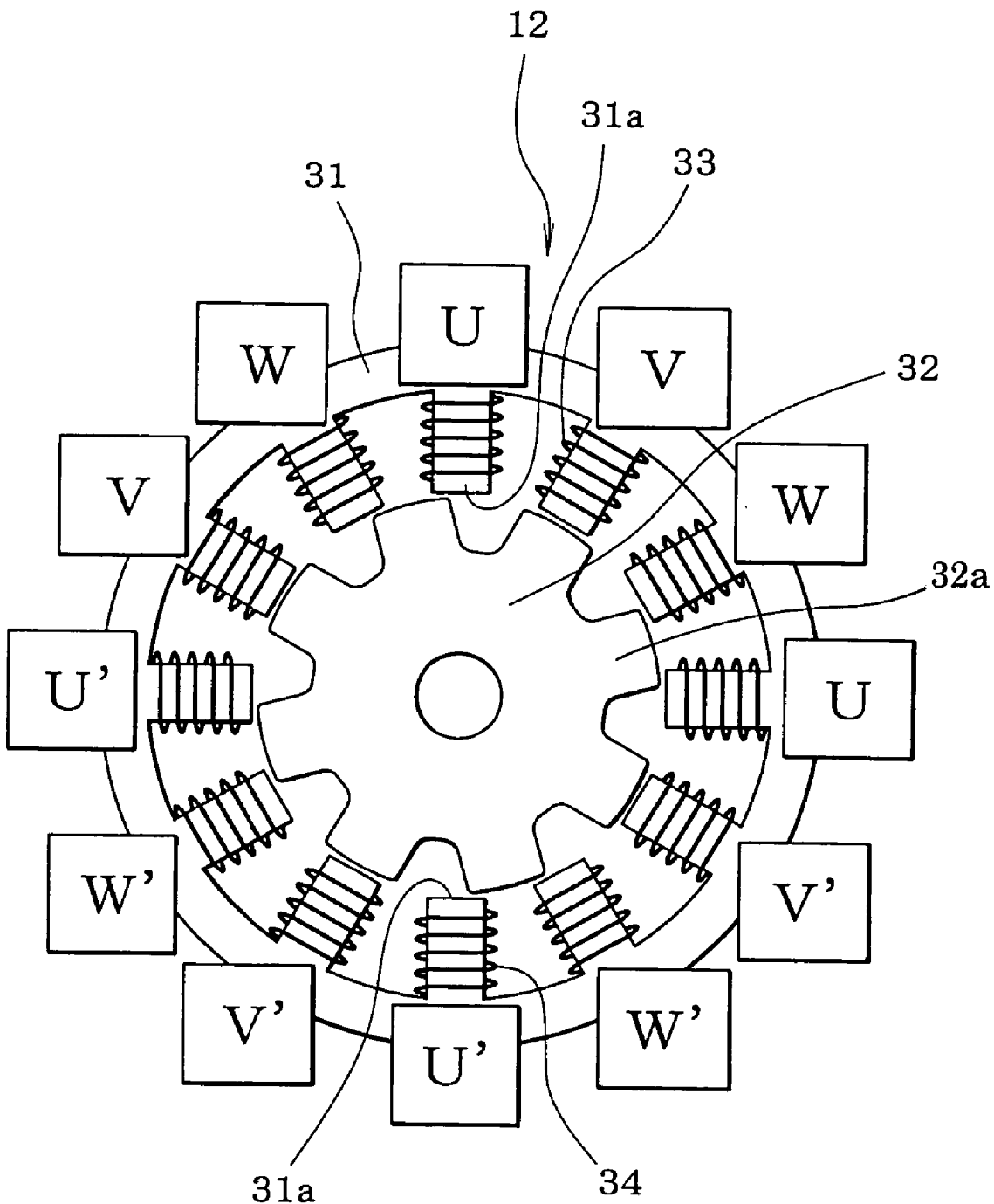
FIG. 2 shows the structure of an SR motor.

Next, the structure of the motor 12 will be described with reference to FIG. 2. In this embodiment, the motor 12 is a switched reluctance motor (hereinafter abbreviated as "SR motor"). The SR motor 12, in which both of a stator 31 and a rotor 32 have salient poles, has an advantage that no permanent magnet is necessary and hence the structure is simple. The inner circumferential surface of a cylindrical body of the stator 31 is formed with 12 salient poles 31a, for example, at regular intervals.

On the other hand, the rotor 32 has eight salient poles 32a, for example, that project outward and are arranged at regular intervals in the circumferential direction. As the rotor 32 rotates, each salient pole 32a of the rotor 32 faces the salient poles 31a of the stator 31 in order with a small gap interposed in between. The 12 salient poles 31a of the stator 31 are wound with a total of six windings 33 of U, V, and W-phases and a total of six windings 34 of U', V', and W'-phases in order. The number of salient poles 31a of the stator 31 and the number of salient poles 32a of the rotor 32 may be changed as appropriate.

Figure 3:
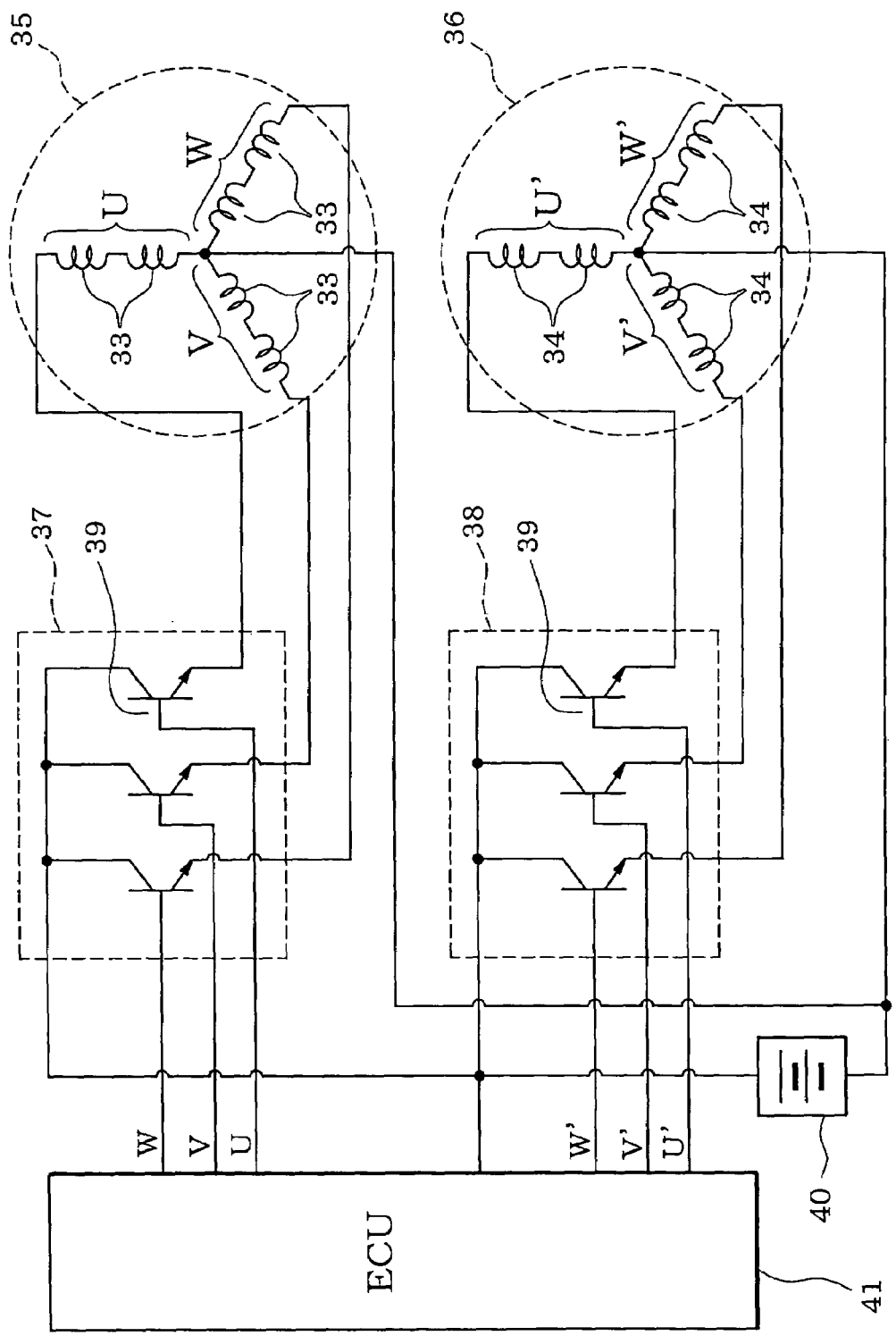
FIG. 3 is a circuit diagram of a circuit for driving the SR motor.

In this embodiment, the windings 33 and 34 are wound on the 12 salient poles 31a of the stator 31 in order of V-phase→W-phase→U-phase→V-phase→W-phase→U-phase→V'-phase→W'-phase→U'-phase→V'-phase→W'-phase→U'-phase, for example. As shown in FIG. 3, the six windings 33 of the U, V, and W-phases and the six windings 34 of the U', V', and W'-phases are connected to each other so as to form two systems of motor engergizing sections 35 and 36. The one motor energizing section 35 is formed by Y-connecting the six windings 33 of the U, V, and W-phases (the two windings 33 of the same phase are connected to each other in series). The other one motor energizing section 36 is formed by Y-connecting the six windings 34 of the U', V', and W'-phases (the two windings 34 of the same phase are connected to each other in series). In the two motor energizing sections 35 and 36, the windings of the U-phase and the U'-phase are energized at the same time, the windings of the V-phase and the V'-phase are energized at the same time, and the windings of the W-phase and the W'-phase are energized at the same time.

The two motor energizing sections 35 and 36 are driven by separate motor drivers 37 and 38, respectively, with a battery 40 of the vehicle used as a power source. Providing the two systems of motor energizing sections 35 and 36 and the two systems of motor drivers 37 and 38 in this manner makes it possible to rotate the SR motor 12 through the other system even if one system fails. Although the circuit configuration of each of the motor drivers 37 and 38 is of a unipolar driving type in which a switching element 39 such as a transistor is provided for each phase, a bipolar driving type circuit configuration may be employed in which two switching elements are provided for each phase. This configuration is also applicable to a case in which only a single-system motor energizing section and only a single-system motor driver are provided.

The on/off control on the switching elements 39 of the motor drivers 37 and 38 is performed by an ECU 41 (electronic control unit). As shown in FIG. 4, the ECU 41 and the motor drivers 37 and 38 are incorporated in a position switching controller 42. Manipulation signals from a P-position switch 43 for a manipulation of switching to the P-position and a non-P-position switch 44 for a manipulation of switching to the non-P-position are input to the position switching controller 42. A range that has been selected by manipulating the P-position switch 43 or the non-P-position switch 44 is indicated in a range indication section 45 that is provided in an instrument panel (not shown). The P-position switch 43 or the non-P-position switch 44 are momentary switches, for example.

Figure 5:
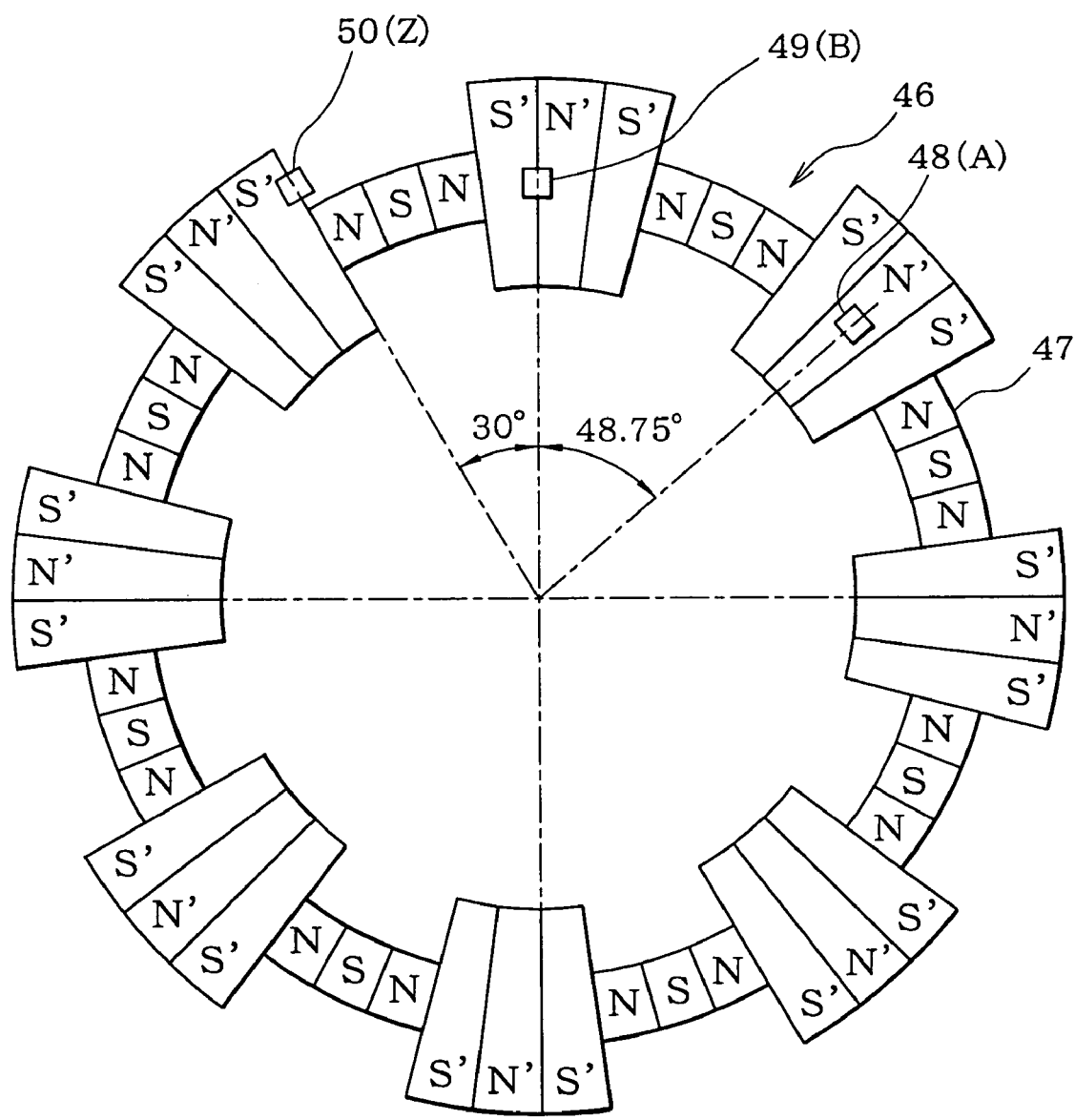
FIG. 5 is a plan view showing the structure of a rotary magnet of an encoder.
Figure 6:
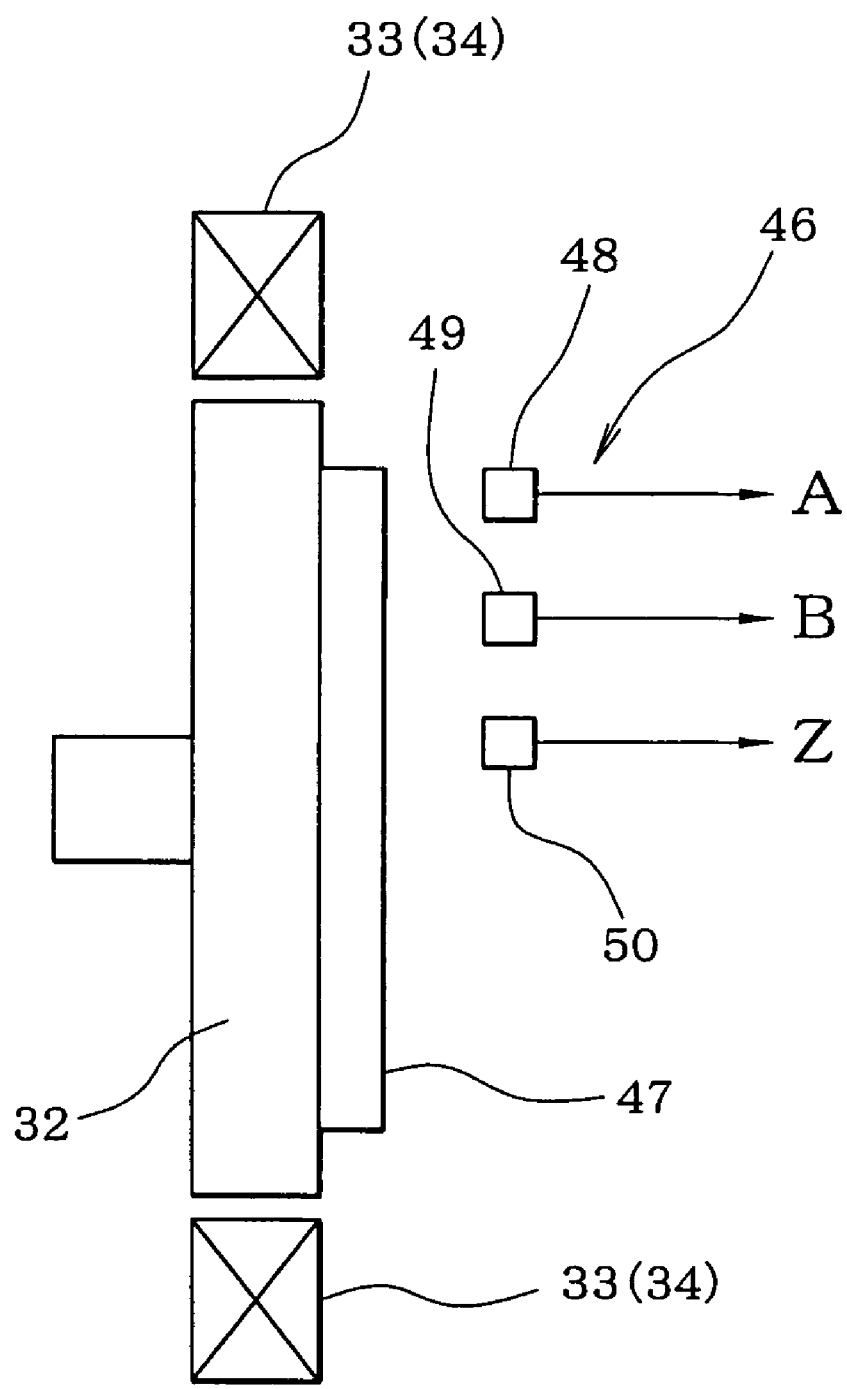
FIG. 6 is a side view of the encoder.

The SR motor 12 is equipped with an encoder 46 for detecting a rotation position of the rotor 32. A specific structure of the encoder 46, which is a magnetic rotary encoder, for example, is as follows. As shown in FIGS. 5 and 6, an annular rotary magnet 47 that is magnetized in such a manner that N poles and S poles are arranged alternately in the circumferential direction with a constant pitch is fixed to a side surface of the rotor 32 concentrically. Three magnetism detecting elements 48–50 such as Hall ICs are opposed to the rotary magnet 47. In this embodiment, the magnetization pitch of the N poles and the S poles of the rotary magnet 47 is set at 7.5°, which is equal to a rotation angle of the rotor 32 corresponding to single current supply on the SR motor 12. As described later, when the current supply phase of the SR motor 12 is switched six times by a one/two-phase current supply method, current supply is effected for all the phases around and the rotor 32 and the rotary magnet 47 rotate together by 7.5°×6=45°. The number of N poles and S poles existing in this rotation angle range 45° of the rotary magnet 47 is six in total.

N poles (N' poles) corresponding to reference rotation positions of the rotor 32 and S poles (S' poles) on both sides of each of those N poles are wider than the other magnetic poles in the radial direction. In this embodiment, in view of the fact that the rotor 32 and the rotary magnet 47 rotate together by 45° while current supply is effected for all the phases of the SR motor 12 around, the wide magnetized portions (N') corresponding to the reference rotation positions of the rotor 32 are formed with a pitch of 45°. Therefore, a total of eight wide magnetized portions (N') corresponding to the reference rotation positions are formed in the entire rotary magnet 47. Alternatively, a single wide magnetized portion (N') corresponding to a reference rotation position may be formed in the entire rotary magnet 47.

The three magnetism detecting elements 48–50 are disposed so as to have the following positional relationships with each other and with the rotary magnet 47. The magnetism detecting element 48 for outputting the A-phase signal and the magnetism detecting element 49 for outputting the B-phase signal are disposed on the same circle at such positions as to be able to face both of the narrow magnetized portions (N and S) and the wide magnetized portions (N' and S') of the rotary magnet 47. On the other hand, the magnetism detecting element 50 for outputting a Z-phase signal is disposed outside or inside the narrow magnetized portions (N and S) of the rotary magnet 47 at such positions as to be able to face only the wide magnetized portions (N' and S'). The interval between the two magnetism detecting elements 48 and 49 for outputting the A-phase signal and the B-phase signal, respectively, is set so that the phase difference between the A-phase signal and the B-phase signal becomes 90° in terms of an electrical angle (3.75° in terms of a mechanical angle) as shown in FIG. 7A.

The term "electrical angle" means an angle that is obtained when the cycle of occurrence of each of the A-phase signal and the B-phase signal is regarded as 360°. The term "mechanical angle" is an angle that is obtained when the angle of one rotation of the rotor 32 is regarded as 360°; that is, the mechanical angle of the phase difference between the A-phase signal and the B-phase signal is an angle by which the rotor 32 rotates in a time from a trailing edge (or rising edge) of the A-phase signal to that of the B-phase signal. The magnetism detecting element 50 for outputting the Z-phase signal is disposed so that the phase difference between the Z-phase signal and the B-phase signal (or A-phase signal) becomes 0.

The outputs of the respective magnetism detecting elements 48–50 are at a high level "1" when they face an N pole (or N' pole) and are at a low level "0" when they face an S pole (or S' pole). The output (Z-phase signal) of the magnetism detecting element 50 is at a high level "1" when it faces a wide N' pole corresponding to a reference rotation position of the rotor 32 and is at a low level when it is located at the other positions.

In this embodiment, the rotor 32 is rotated as the ECU 41 counts both of rising edges and trailing edges of the A-phase signal and the B-phase signal according to an encoder counter routine (described later) and switches the current supply phase of the SR motor 12 on the basis of the encoder count. In this operation, the ECU 41 determines the rotation direction of the rotor 32 on the basis of the order of occurrence of the A-phase signal pulse and the B-phase signal pulse. The ECU 41 increases the encoder count in the case of normal rotation (i.e., rotation in a direction from the P-position to the non-P position), and decreases the encoder count in the case of reverse rotation (i.e., rotation in a direction from the non-P-position to the P-position). With this measure, the correspondence between the encoder count and the rotation position of the rotor 32 is maintained irrespective of whether the rotor 32 is rotating in the normal direction or the reverse direction. Therefore, the rotor 32 can be rotated in either the normal direction or the reverse direction by detecting the rotation position (i.e., rotation angle) of the rotor 32 on the basis of the encoder count and energizes windings 33 or 34 of A-phase corresponding to the detected rotation position.

FIGS. 7A and 7B show output waveforms of the encoder 46 and a current supply phase switching pattern in a case that the rotor 32 is rotated in the reverse direction (i.e., the rotation direction from the non-P-position to the P-position), respectively. In either of the case that the rotor 32 is rotating in the reverse direction (i.e., the rotation direction from the non-P-position to the P-position) and the case that the rotor 32 is rotating in the normal direction (i.e., the rotation direction from the P-position to the non-P-position), switching is made between one-phase current supply and two-phase current supply every time the rotor 32 rotates by 7.5°. As the rotor 32 rotates by 45°, current supply is effected for all the phases around in order of U-phase→U and W-phases→W-phase→V and W-phases→V-phase→U and V-phases, for example. Every time the current supply phase is switched, the rotor 32 rotates by 7.5° and the magnetic poles of the rotary magnet 47 that face the A-phase signal magnetism detecting element 48 and the B-phase signal magnetism detecting element 49 change from an N pole to an S pole (or an N' pole to an S' pole) or from an S pole to an N pole (or an S' pole to an N' pole), whereby the levels of the A-phase signal and the B-phase signal are inverted alternately.

As a result, the encoder count increases (or decreases) by two every time the rotor rotates by 7.5°. Further, every time current supply is effected for all the phases around and the rotor rotates by 7.5°, the Z-phase magnetism detecting element 50 faces a wide N' pole corresponding to a reference rotation position of the rotor 32 and the Z signal has a high-level value "1." In this specification, an event that the A-phase signal, the B-phase signal, or the Z-phase signal has a high-level value "1" may be referred to as "the A-phase signal pulse, the B-phase signal pulse, or a Z-phase signal pulse is output."

In the SR motor 12 incorporating the encoder 46, a position switching control is performed in the following manner. Every time the instructed shift position (i.e., target position) is switched from the P-position to the non-P-position or in the opposite direction, a feedback control is performed in which the rotor 32 is rotated to the target position by sequentially switching the current supply phase of the SR motor 12 on the basis of the encoder count. When the encoder count has reached a target count that is set in accordance with the target position, the feedback control is finished with a determination that the rotor 32 has reached the target position. The rotor 32 is stopped at the target position.

In this case, if the rotation speed of the rotor 32 in a feedback control is set high, because of its inertia the rotor 32 tends to overshoot a target position after the end of the feedback control: it is difficult to stop the rotor 32 correctly at the target position.

In view of the above, in this embodiment, when the difference between the rotation position of the rotor 32 (i.e., the encoder count) and a target position (i.e., a target count) has become smaller than a prescribed value, a transition is made to a deceleration control in which the phase lead of the current supply phase with respect to the rotation phase of the rotor 32 is corrected in accordance with the rotation speed of the rotor 32. In this manner, braking force suitable for the rotation speed of the rotor 32 is caused to act on the rotor 32. More specifically, in the deceleration control, as the rotation speed of the rotor 32 decreases, the phase lead of the current supply phase is corrected in such a direction that the braking force exerted on the rotor 32 is decreased. With this measure, the rotor 32 is decelerated smoothly as it approaches the target position.

Further, in this embodiment, in the deceleration control, the phase lead of the current supply phase is corrected by taking into consideration, in addition to the rotation speed of the rotor 32, the rotation angle from the present rotation position of the rotor 32 (i.e., the encoder count) to the target position (i.e., target count). This measure makes it possible to decelerate the rotor 32 reliably by increasing the braking force that is exerted on the rotor 32 when it approaches the target position even in the case where the deceleration of the rotor 32 is delayed for a certain reason: the rotor 32 can be stopped at the target position accurately.

Here, in a feedback control, the current supply phase is switched in synchronism with pulses of an A-phase signal and a B-phase signal of the encoder 46. Therefore, if the rotation of the rotor 32 is stopped for a certain reason during a deceleration control and the encoder 46 comes not to output A-phase and B-phase signals, the current supply phase can no longer be switched, resulting in a problem that the rotor 32 cannot be rotated to a target position.

As a countermeasure, in this embodiment, time-synchronous current supply phase setting processing in which the current supply phase is set on the basis of the encoder count in a prescribed cycle (e.g., every 1 ms) is performed parallel with a feedback control from the start of the feedback control to arrival of the rotor 32 to a target position.

In this configuration, even if the rotation of the rotor 32 is stopped for a certain reason during a feedback control and the encoder 46 comes not to output A-phase and B-phase signals, a current supply phase is set by time-synchronous current supply phase setting processing on the basis of an encoder count at that time point. Therefore, the current supply phase can be switched by the time-synchronous current supply phase setting processing even in a state that the rotation of the rotor 32 is stopped, and the rotor 32 can be rotated to a position that is as close to a target position as possible. The reliability of the feedback control (i.e., position switching control) of the SR motor 12 can thus be increased.

The details of individual routines that are executed by the ECU 41 of the position switching controller 42 will be hereinafter described.

[Encoder Counter]

Figures 8, 9:
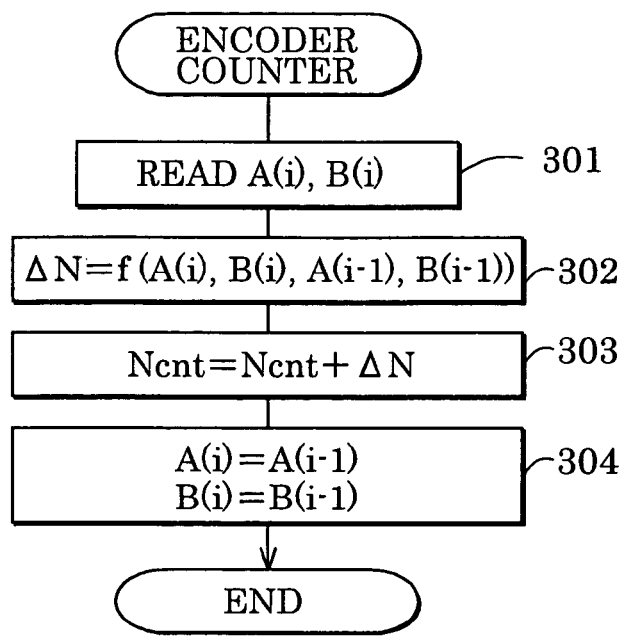
FIG. 8 is a flowchart of an encoder counter routine.
FIG. 9 shows an exemplary count increment ΔN calculation map.

The details of an encoder counter routine shown in FIG. 8 will be described below. This routine is activated by The B-phase interruption processing in synchronism with both of rising edges and trailing edges of the A-phase signal and the B-phase signal and counts both of rising edges and trailing edges of the A-phase signal and the B-phase signal in the following manner. Upon activation of this routine, at step 301, a value A(i) of the A-phase signal and a value B(i) of the B-phase signal are read. At the next step 302, a count difference (increment) ΔN corresponding to the present values A(i) and B(i) and preceding values A(i−1) and B(i−1) of the A-phase signal and the B-phase signal is calculated by searching a count increment ΔN calculation map shown in FIG. 9.

Figure 10:
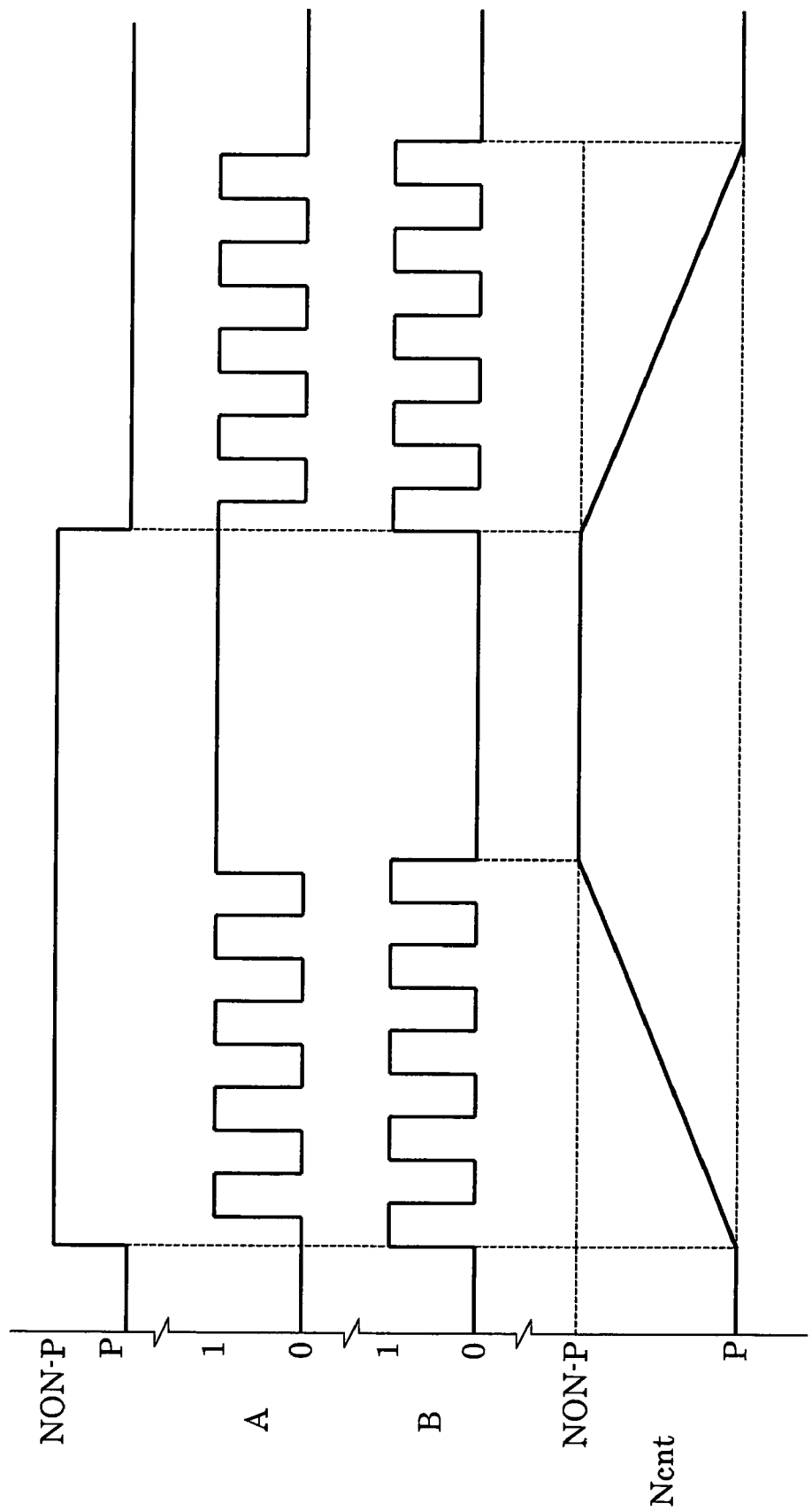
FIG. 10 is a time chart showing a relationship between an instructed shift position, the A-phase signal, the B-phase signal, and an encoder count.

The reason for using the present values A(i) and B(i) and the preceding values A(i−1) and B(i−1) of the A-phase signal and the B-phase signal is to determine a rotation direction of the rotor 32 on the basis of the order of occurrence of pulses of the A-phase signal and the B-phase signal. As shown in FIG. 10, in the case of normal rotation (i.e., the rotation direction from the P-position to the non-P-position), the encoder count Ncnt is increased by giving the positive sign to the count increment ΔN. In the case of reverse rotation (i.e., the rotation direction from the non-P-position to the P-position), the encoder count Ncnt is decreased by giving the negative sign to the count increment ΔN.

After the calculation of the count increment ΔN, the routine proceeds to step 303, where a new encoder count Ncnt is calculated by adding the count increment ΔN as calculated at step 302 to the preceding encoder count Ncnt. at the next step 304, for the next counting processing, the present values A(i) and B(i) of the A-phase signal and the B-phase signal are stored as values A(i−1) and B(i−1), respectively. This routine is then finished.

[Control Mode Setting]

Figure 11:
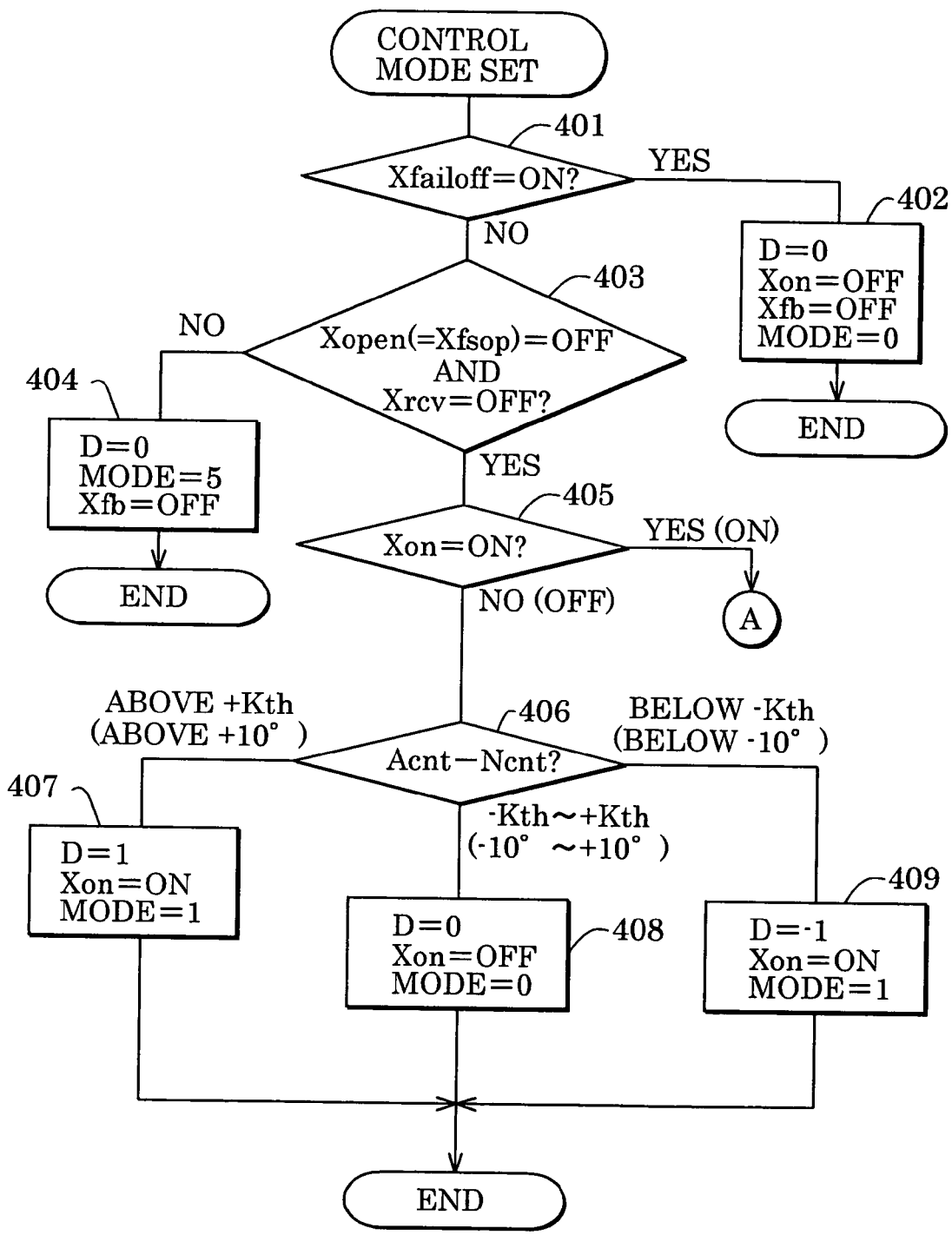
FIGS. 11–13 are flowcharts of a control mode setting routine.
Figure 12:
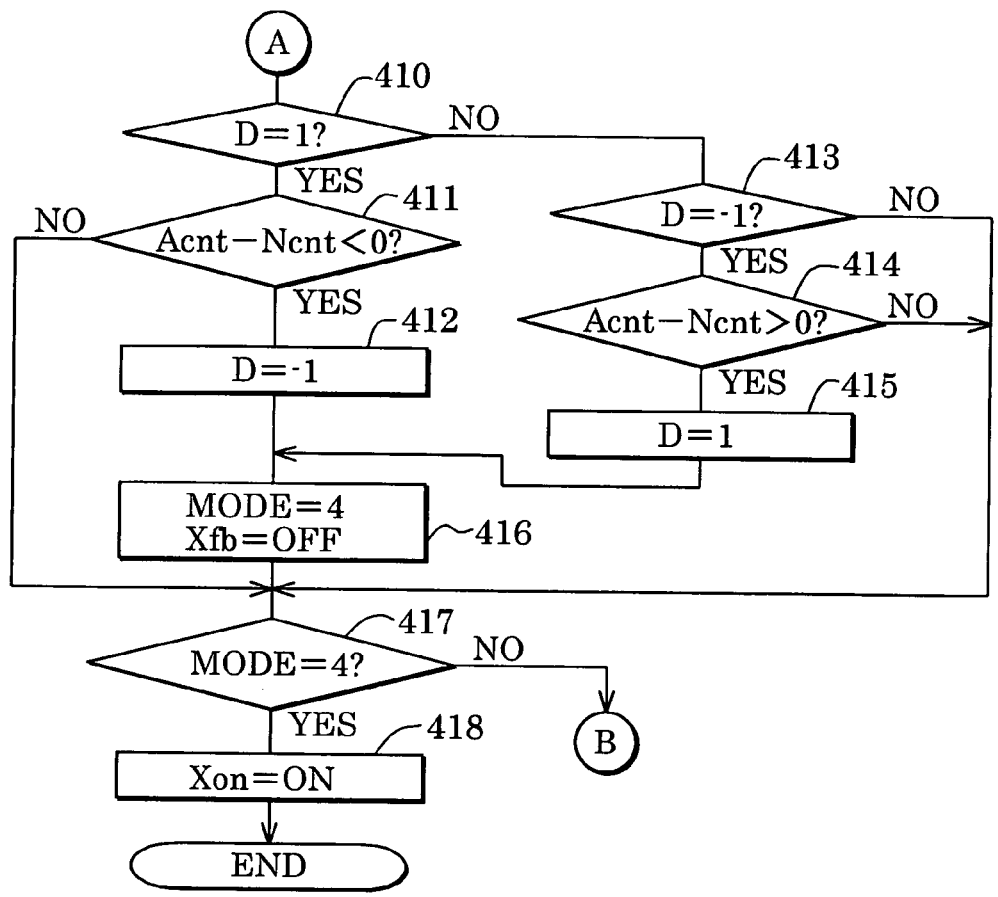
Figure 13:
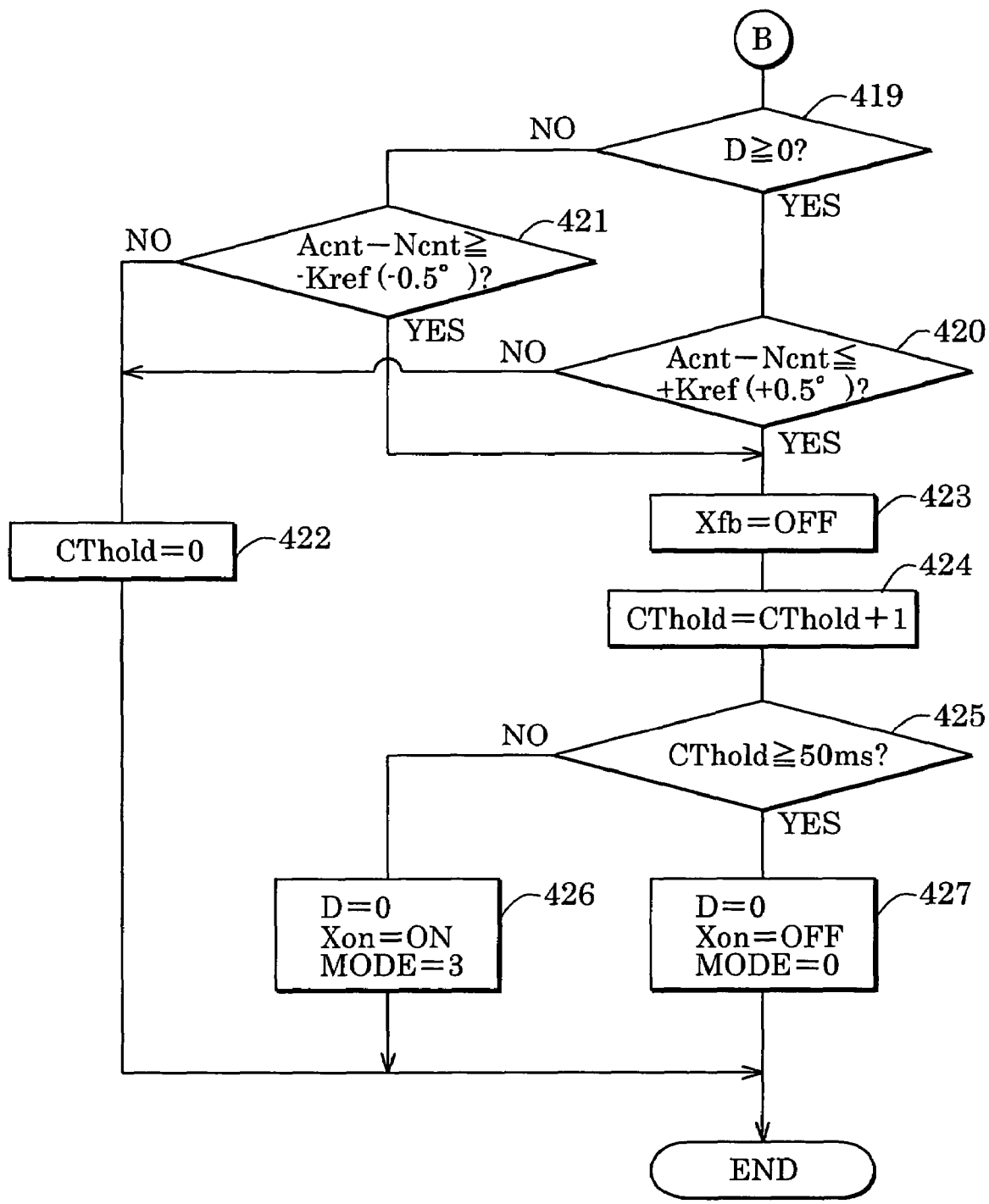

A control mode setting routine shown in FIGS. 11–13 is executed in a prescribed cycle (e.g., every 1 ms) after the end of an initial drive. The initial drive is processing for correlating the encoder count with an actual rotation position of the rotor 32 after application of power to the ECU 41. In the initial drive, edges of the A-phase signal and the B-phase signal of the encoder 46 are counted while current supply is effected for all the phases of the SR motor 12 around according to a prescribed time schedule, whereby a corresponding relationship between the encoder count and the rotation position (i.e., current supply phase) of the rotor 32 at the end of the initial drive is learned. More specifically, the encoder count at the end of an initial drive is learned as an initial positional deviation learned value and encoder counts in a later feedback control or the like are corrected by the initial positional deviation learned value. In this manner, a deviation between the encoder count and the current supply phase (i.e., rotation position of the rotor 32) at the end of the initial drive is corrected for, as a result of which correct current supply phases can be selected in the feedback control or the like.

A control mode setting routine shown in FIGS. 11–13, which is executed every predetermined time (e.g., every 1 ms) after the end of an initial drive, specifies a control mode in the following manner by setting a control mode determination value "mode" to one of 0, 1, 3, 4, and 5.

mode=0: current supply off (standby)

mode=1: ordinary drive (feedback control start position stopping and holding process and feedback control)

mode=3: target position stopping and holding process mode=4: reversing position stopping and holding process mode=5: open-loop control Upon activation of the control mode setting routine, at step 401, it is determined whether a system failure flag Xfailoff is set to "on" meaning that the position switching control device 42 is in failure. If the flag Xfailoff is "on," the routine proceeds to step 402, where a process for keeping the SR motor 12 in the current-supply off-state is executed, whereupon the following settings are made: a rotation direction instruction value D=0 (stop), a current supply flag Xon=off (current supply off), a feedback permission flag Xfb=off (a feedback control prohibited), and the control mode determination value "mode"=0 (current supply off).

On the other hand, if the system failure flag Xfailoff is "off" (no failure), the routine proceeds from step 401 to step 403, where it is determined whether a fail-safe process execution flag Xfsop is "off" and the recovery process execution flag Xrcv is "off." If one or both of the fail-safe process execution flag Xfsop and the recovery process execution flag Xrcv are "on," the routine proceeds to step 404, where the following settings are made to execute an open-loop control: the rotation direction instruction value D=0 (stop), the control mode determination value "mode"=5 (open-loop control), and the feedback permission flag Xfb=off (feedback control prohibited).

If both of the fail-safe process execution flag Xfsop and the recovery process execution flag Xrcv are "off," the routine proceeds to step 405, where it is determined whether the current supply flag Xon is "on" (current supply on). If the current supply flag Xon is "off" (current supply off), the routine proceeds to step 406, where the difference between a target count Acnt and an encoder count Ncnt (i.e., the difference between a target position and a position of the rotor 32) is calculated and it is determined on the basis of the difference Acnt−Ncnt which of normal rotation (i.e., rotation from the P-position position to the non-P-position position), reverse rotation (i.e., rotation from the non-P-position position to the P-position position), and a stop the current rotation mode is. at this time, a value as corrected by using an initial positional deviation learned value Gcnt that was learned in the initial drive routine of FIGS. 8 and 9 is used as the encoder count Ncnt:

$$Ncnt=Ncnt-Gcnt$$

If the difference Acnt−Ncnt between the target count Acnt and the encoder count Ncnt is greater than or equal to +Kth (e.g., +10°), it is determined that the rotor 32 needs to be rotated in the normal direction (i.e., the rotation direction from the P-position position to the non-P-position position). The routine proceeds to step 407, where the following settings are made: the rotation direction instruction value D=1 (normal rotation), the current supply flag Xon=on (current supply on), and the control mode determination value "mode"=1 (feedback control start position stopping and holding process and feedback control).

If the difference Acnt−Ncnt between the target count Acnt and the encoder count Ncnt is smaller than or equal to −Kth (e.g., −10°), it is determined that the rotor 32 needs to be rotated in the reverse direction (i.e., the rotation direction from the non-P-position position to the P-position position). The routine proceeds to step 409, where the following settings are made: the rotation direction instruction value D=−1 (reverse rotation), the current supply flag Xon=on (current supply on), and the control mode determination value "mode"=1 (feedback control start position stopping and holding process and feedback control).

If the difference Acnt−Ncnt between the target count Acnt and the encoder count Ncnt is in a range of −Kth to +Kth (e.g., −10° to +10°), it is determined that the rotor 32 can be kept at the target position by spring force of the detent spring 23 (i.e., it is not necessary to energize the SR motor 12). The routine proceeds to step 408, where the following settings are made to keep the SR motor 12 in a current-supply off-state: the rotation direction instruction value D=0 (stop), the current supply flag Xon=off (current supply off), and the control mode determination value "mode"=0 (current supply off).

On the other hand, if it is determined at step 405 that the current supply flag Xon is "on" (current supply on), steps 410–415 shown in FIG. 12 are executed, whereby it is determined whether the instructed shift position (target position) has been reversed, and if the instructed shift position has been reversed, the rotation direction instruction value D is reversed.

More specifically, first, it is determined at step 410 whether the rotation direction instruction value D is equal to "1" (normal rotation). If the rotation direction instruction value D is equal to "1" (normal rotation), the routine proceeds to step 411, where whether it is necessary to change the rotation direction of the rotor 32 from the normal direction to the reverse direction is determined on the basis of whether the difference Acnt−Ncnt between the target count Acnt and the encoder count Ncnt has a negative value. If it is necessary to change the rotation direction of the rotor 32 that way, the routine proceeds to step 412, where the rotation direction instruction value D is set to "−1" (reverse rotation).

In contrast, if it is determined at step 410 that the rotation direction instruction value D is not equal to "1" (normal rotation), that is, if it is determined that the value D is equal to "0" or "−1," the routine proceeds to step 413, where it is determined whether the rotation direction instruction value D is equal to "−1" (reverse rotation). If the value D is equal to "−1" (reverse rotation), the routine proceeds to step 414, where whether it is necessary to change the rotation direction of the rotor 32 from the reverse direction to the normal direction is determined on the basis of whether the difference Acnt−Ncnt between the target count Acnt and the encoder count Ncnt has a positive value. If it is necessary to change the rotation direction of the rotor 32 that way, the routine proceeds to step 415, where the rotation direction instruction value D is set to "1" (normal rotation).

If the rotation direction instruction value D has been reversed in the above manner, the routine proceeds to step 416, where the following settings are made to reverse the rotation direction of the rotor 32: the control mode determination value "mode"=4 (reversing position stopping and holding process) and the feedback permission flag Xfb=off (feedback control prohibited). Then, the routine proceeds to step 417. On the other hand, if the rotation direction instruction value D has not been reversed, the routine proceeds to step 417 skipping step 416.

At step 417, it is determined whether the control mode determination value "mode" is equal to "4" (reversing position stopping and holding process). If the determination result is "yes," the routine proceeds to step 418, where the current supply flag Xon is set to "on" (current supply on), whereupon a reversing position stopping and holding process is executed.

On the other hand, if the determination result at step 417 is "no" (i.e., a reversing position stopping and holding process is not be executed), steps 419–421 shown in FIG. 13 are executed, whereby it is determined whether the feedback control should be finished. Specifically, it is determined at step 419 whether the rotation direction instruction value D is greater than or equal to "0" (normal rotation or a stop). If the value D≧0, the routine proceeds to step 420, where whether the feedback control should be finished is determined on the basis of whether the difference Acnt−Ncnt between the target count Acnt and the encoder count Ncnt is smaller than or equal to +Kref (e.g., +0.5°). If the rotation direction instruction value D is equal to "−1" (reverse rotation), the routine proceeds to step 421, where whether the feedback control should be finished is determined on the basis of whether the difference Acnt−Ncnt between the target count Acnt and the encoder count Ncnt is greater than or equal to −Kref (e.g., −0.5°).

Figure 14:
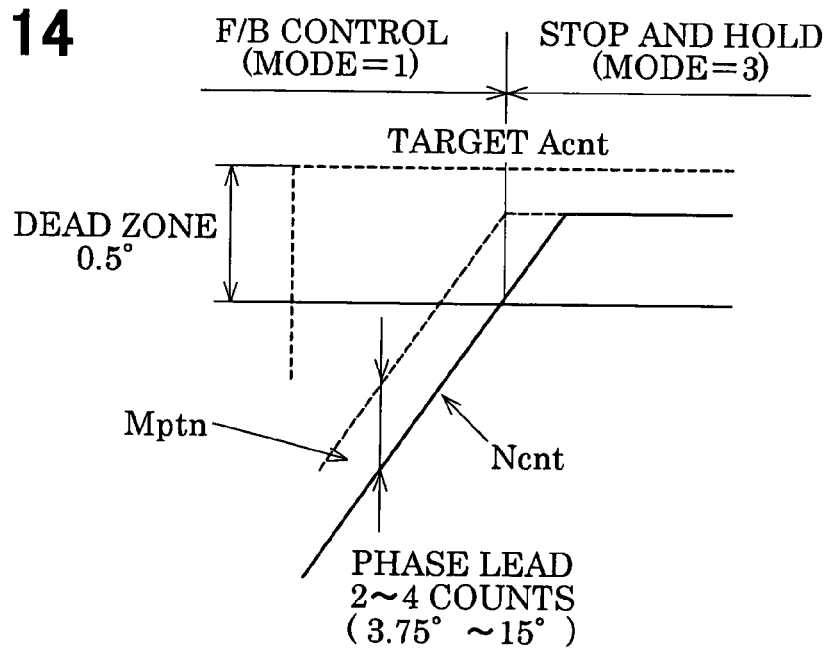
FIG. 14 is a time chart showing timing of a transition from a feedback control to a target position stopping and holding process.

That is, as shown in FIG. 14, by setting the feedback control end determination value Kref to the phase lead (e.g., 2 to 4 counts) of the current supply phase, the feedback control is finished at an instant that precedes, by a time corresponding to the phase lead of the current supply phase, an instant that is determined by the target count Acnt. With this measure, the last current supply phase of the feedback control comes to coincide with a current supply phase with which the rotor 32 is to be stopped and kept at the target position (target count Acnt).

If the determination result at step 420 or 421 is "no" (i.e., the feedback control should not be finished), the routine proceeds to step 422, where the count CThold of a stopping and holding time counter for counting the time of a target position stopping and holding process is reset.

On the other hand, if the determination result at step 420 or 421 is "yes" (i.e., the feedback control should be finished), the routine proceeds to step 423, where the feedback permission flag Xfb is set to "off" (feedback control prohibited), whereupon the feedback control is finished and a transition is made to a target position stopping and holding process. At the next step 424, the count CThold of the stopping and holding time counter is incremented to count the time of the target position stopping and holding process.

Then, at step 425, it is determined whether the time CThold of the target position stopping and holding process has reached a prescribed time (e.g., 50 ms). If the time CThold has not reached the prescribed time (e.g., 50 ms) yet, the routine proceeds to step 426, where the following settings are maintained to continue the target position stopping and holding process: the rotation direction instruction value D=0 (stop), the current supply flag Xon=on (current supply on), and the control mode determination value "mode"=3 (target position stopping and holding process).

When the time CThold of the target position stopping and holding process has reached the prescribed time (e.g., 50 ms), the routine proceeds to step 427, where the following settings are made to turn off the current supply of the SR motor 12: the rotation direction instruction value D=0 (stop), the current supply flag Xon=off (current supply off), and the control mode determination value "mode"=0 (current supply off).

Figure 15:
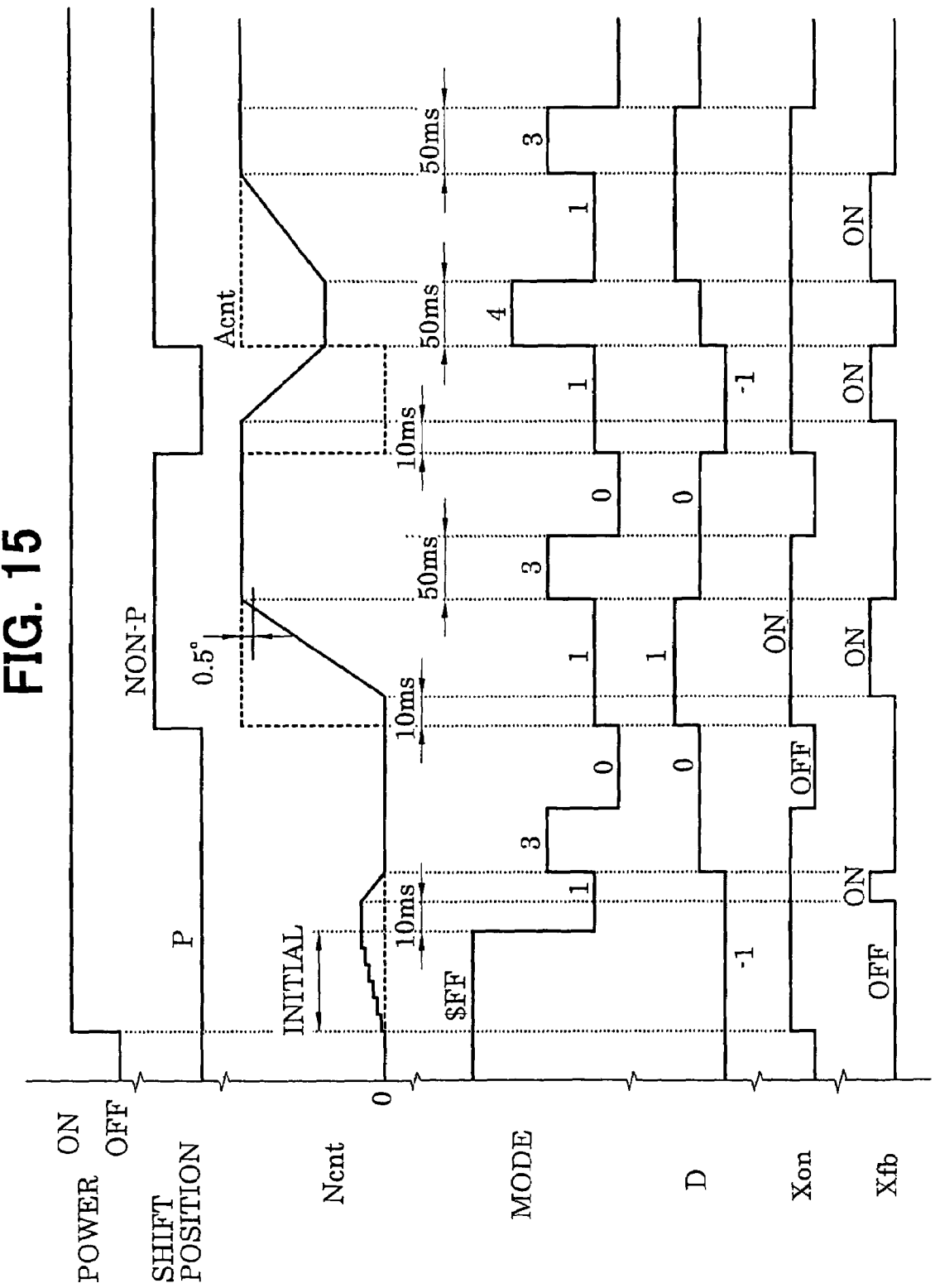
FIG. 15 is a time chart showing an exemplary control on the SR motor.

The control mode determination values "mode" are shown exemplarily in FIG. 15.

[Time-Synchronous Motor Control]

Figure 16:
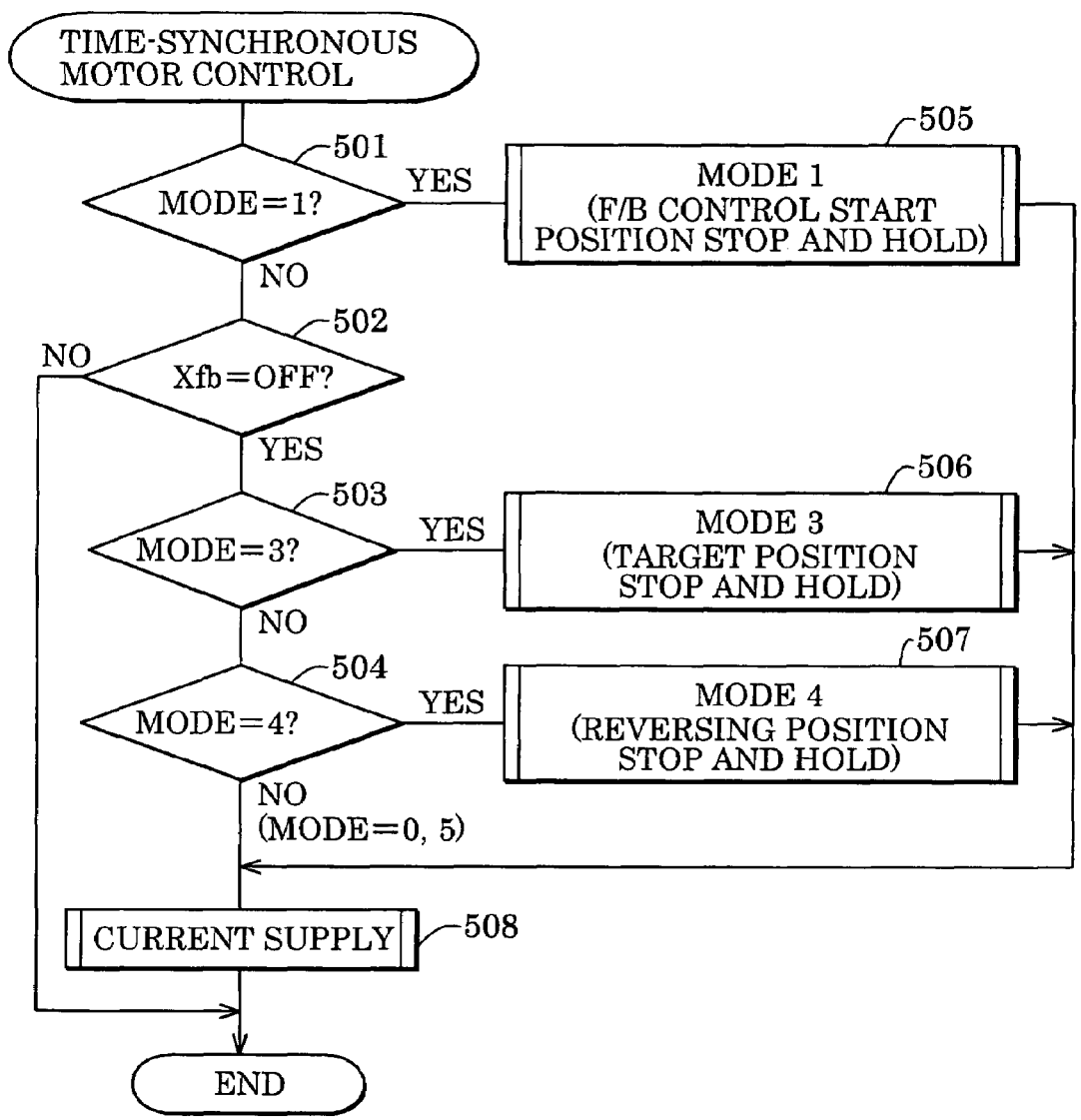
FIG. 16 is a flowchart of a time-synchronous motor control routine.

A time-synchronous motor control routine shown in FIG. 16 is activated in a prescribed cycle (e.g., every 1 ms) after the end of the initial drive. A feedback control start position stopping and holding process, a target position stopping and holding processing, or a reversing position stopping and holding process is executed in this routine.

Figure 17:
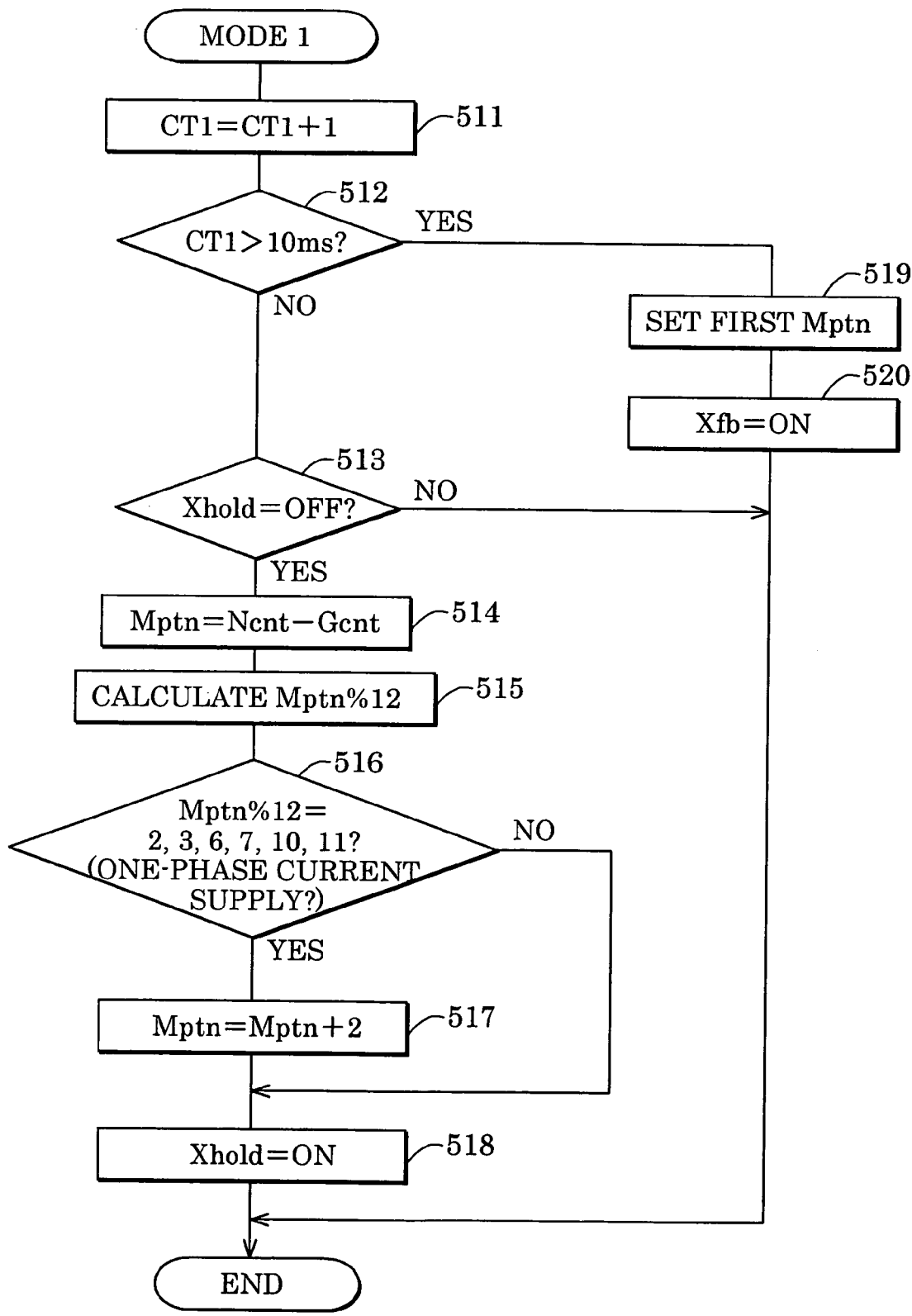
FIG. 17 is a flowchart of a mode-1 routine.

Upon activation of this routine, it is determined at step 501 whether the control mode determination value "mode" is equal to "1" (ordinary drive). If the control mode determination value "mode" is "1," the routine moves to step 505, where a mode-1 routine shown in FIG. 17 is executed, whereby a current supply phase determination value Mptn indicating a current supply phase with which to execute a feedback control start position stopping and holding process and a time-synchronous current supply phase setting process is calculated.

On the other hand, if it is determined at step 501 that the control mode determination value "mode" is not equal to "1," the routine moves to step 502, where it is determined whether the feedback permission flag Xfb is "off" (feedback control prohibited). If the feedback permission flag Xfb is "on" (feedback control permitted), the routine is finished without executing the remaining steps. In this case, current supply phase setting and current supply processing are performed by a feedback control routine shown in FIG. 22.

In this routine, if the control mode determination value "mode" is equal to "1," step 505 (i.e., mode-1 routine of FIG. 17) is executed even if the feedback control is being performed. Therefore, during the feedback control, a feedback process in which the feedback control routine of FIG. 22 sets the current supply phase in synchronism with pulses of the A-phase signal and the B-phase signal that are output from the encoder 46 and a time-synchronous current supply phase setting process in which the mode-1 routine of FIG. 17 sets the current supply phase in a prescribed cycle are executed in parallel. With this measure, even if the rotor 32 is stopped for a certain reason during a feedback control, a current supply phase determination value Mptn is calculated by the time-synchronous current supply phase setting process and the rotor 32 is rotated toward a target position.

Figure 18:
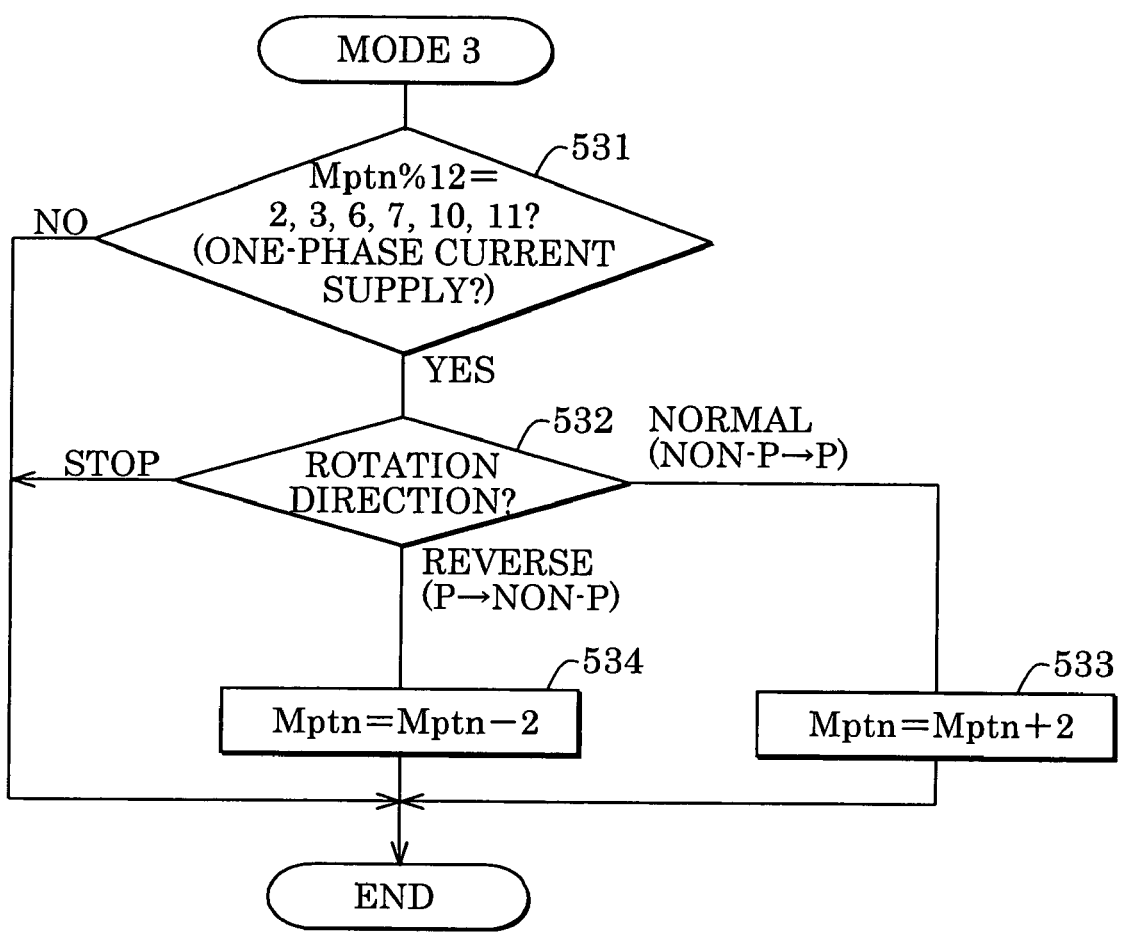
FIG. 18 is a flowchart of a mode-3 routine.

On the other hand, if it is determined at step 502 that the feedback permission flag Xfb is "off" (feedback control prohibited), it is determined at steps 503 and 504 whether the control mode determination value "mode" is equal to "3" or "4." If the control mode determination value "mode" is equal to "3" (target position stopping and holding process), the routine moves from step 503 to 506, where a mode-3 routine shown in FIG. 18 is executed, whereby the current supply phase determination value Mptn indicating a current supply phase with which to execute a target position stopping and holding process is calculated.

Figure 19:
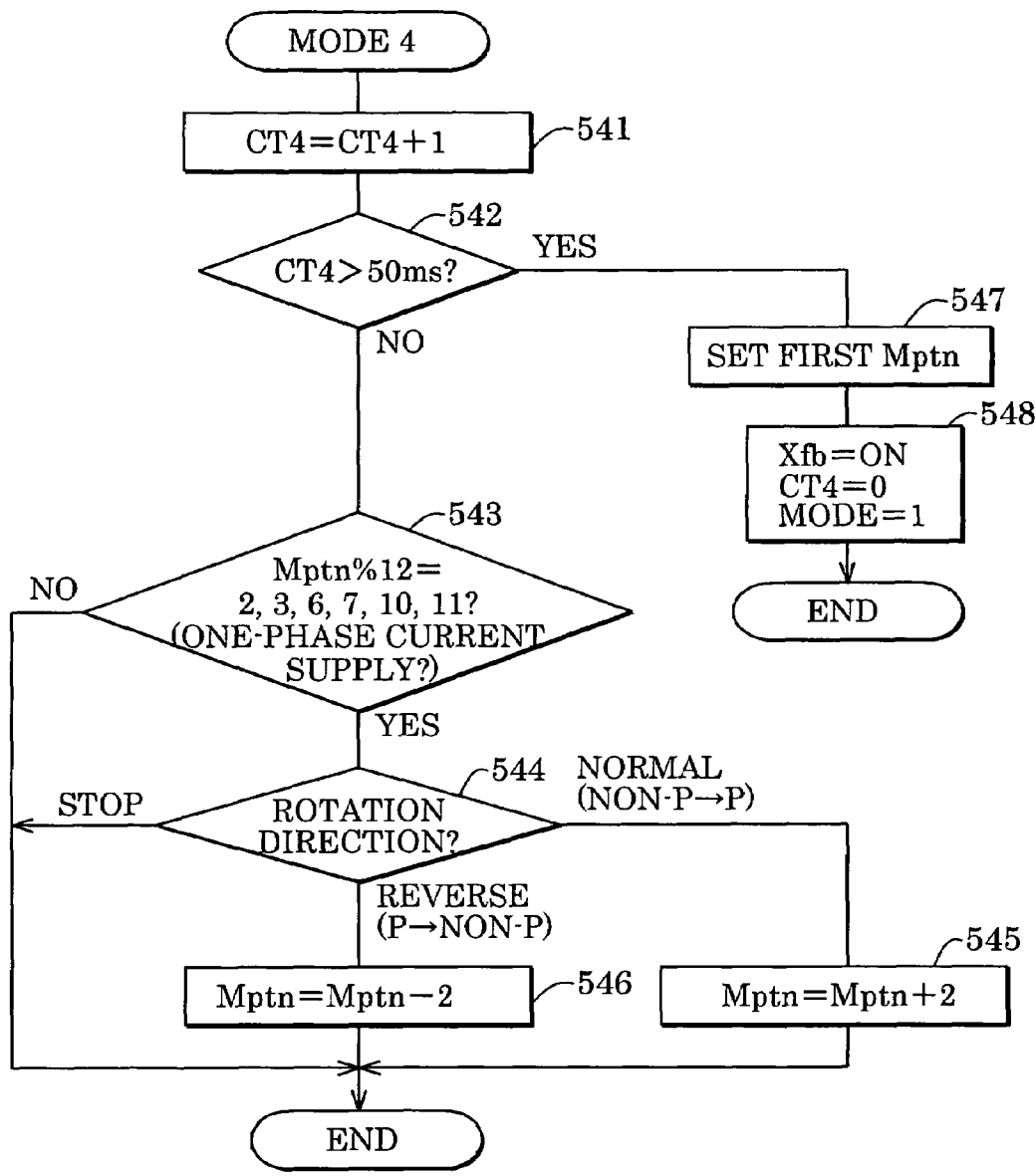
FIG. 19 is a flowchart of a mode-4 routine.

If the control mode determination value "mode" is equal to "4" (reversing position stopping and holding process), the routine moves from step 504 to 507, where a mode-4 routine shown in FIG. 19 is executed, whereby a current supply phase determination value Mptn indicating a current supply phase with which to execute a reversing position stopping and holding process is calculated.

Figures 20, 21:
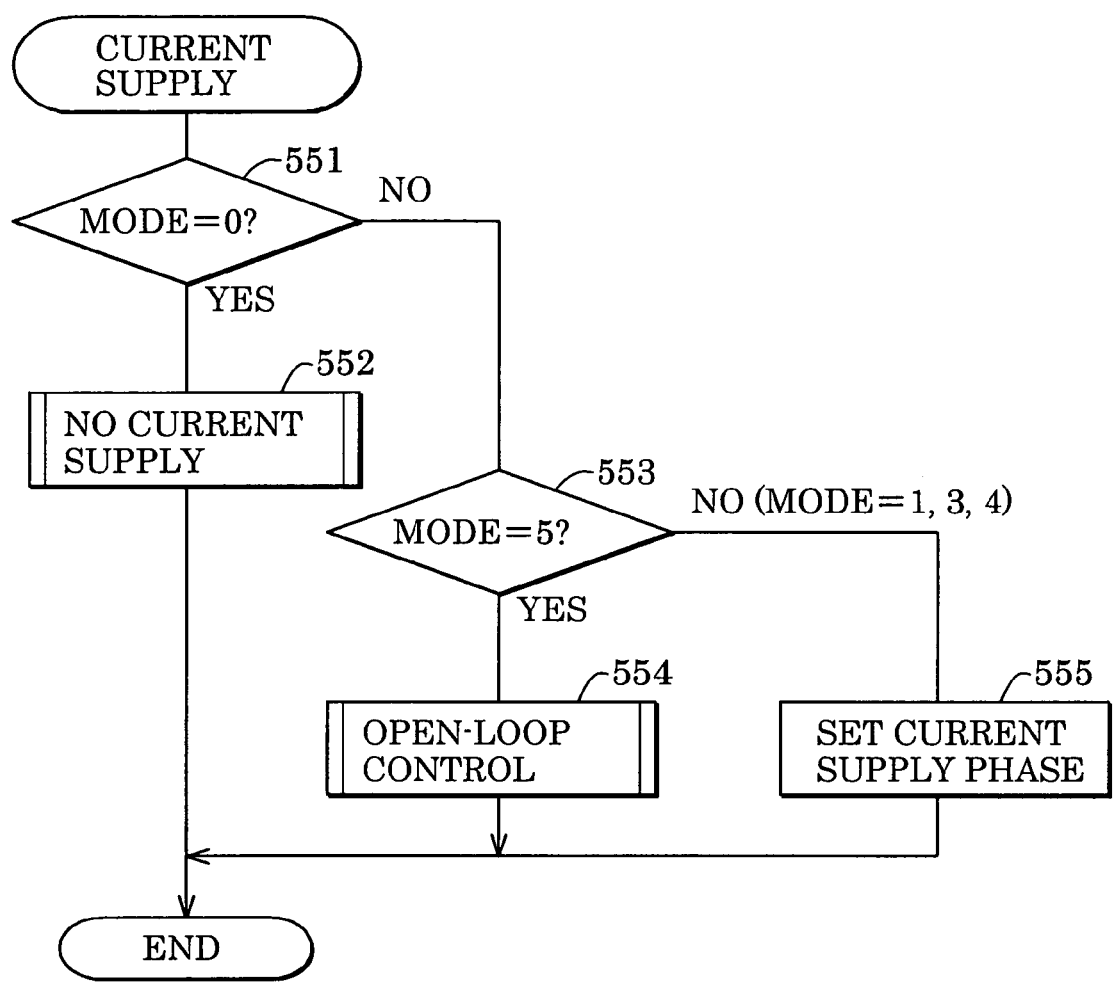
FIG. 20 is a flowchart of a current supply processing routine.
FIG. 21 shows an exemplary conversion table to be used for converting a value Mptn %12 into a current supply phase in the case of a one/two-phase current supply method.

As described above, if the control mode determination value "mode" is equal to 1, 3, or 4, the current supply phase determination value Mptn is calculated and the routine proceeds to step 508, where a current supply processing routine shown in FIG. 20 is executed, that is, an ordinary drive, a target position stopping and holding process, or a reversing position stopping and holding process is executed.

On the other hand, if the determination results at both steps 503 and 504 are "no," that is, if the control mode determination value "mode" is equal to 0 or 5, the routine directly proceeds to step 508, where the current supply processing routine shown in FIG. 20 is executed, that is, the current supply is turned off or an open-loop control is performed.

[Mode-1]

The mode-1 routine shown in FIG. 17 is a subroutine that is activated at step 505 of the time-synchronous motor control routine of FIG. 16. In the mode-1 routine, a current supply phase determination value Mptn indicating a current supply phase with which to execute a feedback control start position stopping and holding process and a time-synchronous current supply phase setting process is set in the following manner.

Upon activation of this routine, at step 511, the count CT1 of a current supply time counter for counting an execution time of a feedback control start position stopping and holding process is incremented. at the next step 512, it is determined whether the time CT1 of the feedback control start position stopping and holding process has exceeded a prescribed time (e.g., 10 ms).

If the time CT1 of the feedback control start position stopping and holding process has not exceeded the prescribed time (e.g., 10 ms) yet, the routine proceeds to step 513, where it is determined whether a stopping and holding process current supply phase storage flag Xhold is "off" (not stored), that is, whether the present instant is immediately before a start of the feedback control start position stopping and holding process. If the stopping and holding process current supply phase storage flag Xhold is "off," the routine proceeds to step 514, where a present position count Ncnt−Gcnt is set as a current supply phase determination value Mptn for the feedback control start position stopping and holding process:

$$Mptn = Ncnt - Gcnt$$

The present position count Ncnt−Gcnt is an encoder count Ncnt as corrected by using an initial positional deviation learned value Gcnt, and represents the present position of the rotor 32 correctly.

Then, the routine proceeds to step 515, where the current supply phase determination value Mptn is divided by 12 and a remainder Mptn %12 is obtained. The number "12", is an increase or decrease of the encoder count Ncnt (i.e., current supply phase determination value Mptn) that occurs when current supply is effected for all the phases around. A current supply phase is determined on the basis of the value Mptn %12 according to a conversion table shown in FIG. 21.

at the next step 516, whether one-phase current supply (U-phase, V-phase, or W-phase) is going to be performed is determined on the basis of whether the value Mptn %12 is equal to 2, 3, 6, 7, 10, or 11. If one-phase current supply is going to be performed, the routine proceeds to step 517, where the current supply phase determination value Mptn is incremented by "2" that corresponds to one step so that the two-phase current supply (U and V-phases, V and W-phases, or U and W-phases) will be performed. Executing the feedback control start position stopping and holding process with two-phase current supply which produces higher holding torque than one-phase current supply does prevents the rotor 32 from vibrating in the vicinity of a feedback control start position and hence can reliably stop and hold the rotor 32 at the feedback control start position.

The stopping and holding process current supply phase storage flag Xhold is set to "on" (stored) at the next step 518, and this routine is finished. When this routine is activated later, the determination result at step 513 should be "no" and hence steps 514–518 are not executed. That is, the processing of setting a current supply phase determination value Mptn indicating a current supply phase with which to execute the feedback control start position stopping and holding process is executed only once immediately before the start of the feedback control start position stopping and holding process.

Then, when the time CT1 of the feedback control start position stopping and holding process has exceeded the prescribed time (e.g., 10 ms), the determination result at step 512 becomes "yes," whereupon the feedback control start position stopping and holding process is finished and a transition is made to a feedback control. During the feedback control, every time this routine is activated in the prescribed cycle (e.g., every 1 ms), at step 519 a current supply phase setting routine shown in FIG. 23 is executed and a current supply phase determination value Mptn is calculated. The current supply phase setting routine shown in FIG. 23 is also activated at step 602 in the feedback control routine in FIG. 22). Then, the routine proceeds to step 520, where the feedback permission flag Xfb is set to "on" (feedback control permitted).

In the control mode setting routine shown in FIGS. 11–13, when the feedback control has made the difference Acnt–Ncnt between the target count Acnt and the encoder count Ncnt smaller than or equal to the prescribed value, it is determined that the rotor 32 has reached the target position (feedback control termination timing), whereupon the feedback permission flag Xfb is set to "off", the feedback control is finished, and the control mode determination value "mode" is set to "3" (target position stopping and holding process). The control mode determination value "mode" is set to "0" (current supply off) at a time point when a prescribed time (e.g., 50 ms) has elapsed since then (see steps 419 and the following steps in FIG. 13).

Therefore, the mode-1 routine of FIG. 17 is not activated after completion of the feedback control, and hence the setting of the current supply phase by the time-synchronous current supply mode setting process of step 519 is performed from the start of the feedback control to the arrival of the rotor 32 to the target position (i.e., to the completion of the feedback control).

Figure 24:
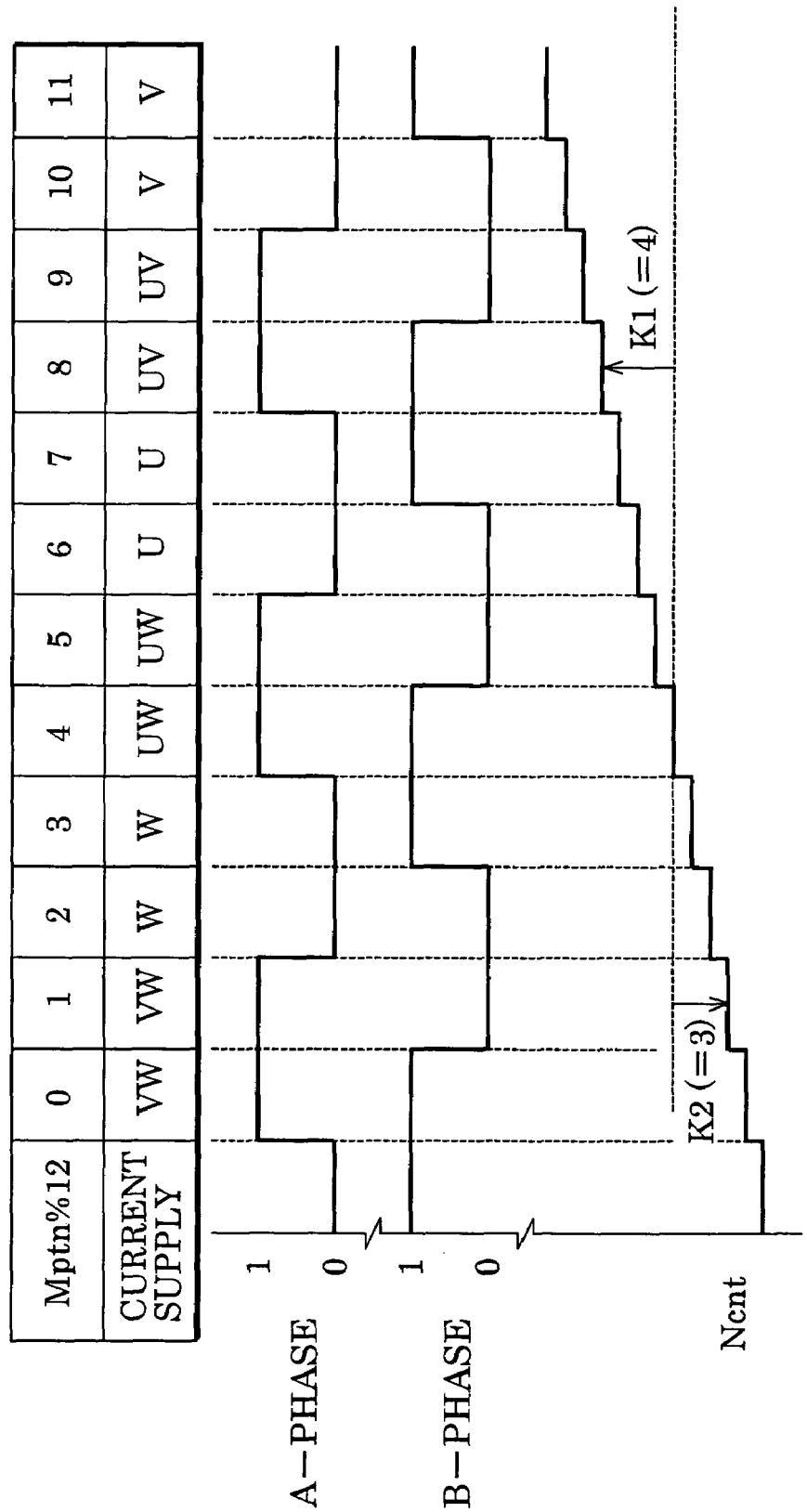
FIG. 24 is a time chart illustrating a current supply process in which rotation is started from a state corresponding to U and V-phases.

FIG. 24 is a time chart illustrating A-phase for which current supply is effected first in the case where rotation is started from a state corresponding to the U and W-phases. In this case, to start normal rotation (i.e., rotation from the P-position to the non-P-position), a current supply phase determination value Mptn is calculated according to the following equation by using an encoder count Ncnt, an initial positional deviation learned value Gcnt, and a normal rotation direction phase lead K1:

$$Mptn = Ncnt - Gcnt + K1$$

If the normal rotation direction phase lead K1 is equal to 4, for example, a current supply phase determination value Mptn is calculated according to the following equation:

$$Mptn = Ncnt - Gcnt + 4$$

To start normal rotation from a state corresponding to the U and W-phases, mod(Ncnt–Gcnt) is 4 and hence Mptn %12 is equal to 8 (=4+4). The U and V-phases are set as first current supply phases.

On the other hand, to start reverse rotation (i.e., rotation from the non-P-position to the P-position) from a state corresponding to the U and W-phases, if a reverse rotation direction phase lead K2 is equal to 3, for example, a current supply phase determination value Mptn is calculated according to the following equation:

$$Mptn = Ncnt - Gcnt - K2$$
$$= Ncnt - Gcnt - 3$$

To start reverse rotation from a state corresponding to the U and W-phases, Mptn %12 is equal to 1 (=4–3). The V and W-phases are set as first current supply phases.

In this manner, by setting the normal rotation direction phase lead K1 and the reverse rotation direction phase lead K2 to 4 and 3, respectively, current supply phase switching patterns for the normal rotation direction and the reverse rotation direction can be made symmetrical. In either of the normal rotation direction and the reverse rotation direction, rotation can be started by effecting current supply first for A-phase of a position that is two steps deviated from the current position of the rotor 32.

[Mode-3]

The mode-3 routine shown in FIG. 18 is a subroutine that is activated at step 506 of the time-synchronous motor control routine of FIG. 16. In the mode-3 routine, a current supply phase determination value Mptn (current supply phase) for a target position stopping and holding process is set in the following manner.

Upon activation of this routine, at step 531, whether the current supply phase at the end of the feedback control is one phase (U-phase, V-phase, or W-phase) is determined on the basis of whether the value Mptn %12 is equal to 2, 3, 6, 7, 10, or 11. If it is one-phase, steps 532–534 are executed, whereby the current supply phase determination value Mptn is incremented or decremented by 2 in accordance with the rotation direction of the feedback control performed so far and the current supply phase is thereby changed to two phases next to the current one phase.

In doing so, at step 532 the rotation direction is determined in the following manner. The rotation direction instruction value D is set to "0" (stop) at step 426 in FIG. 13 immediately before this routine is activated (i.e., when the feedback control has finished). Therefore, the rotation direction cannot be determined by checking the rotation direction instruction value D. In view of this, in this embodiment, with attention paid to the fact that the current supply phase determination value Mptn at the end of the feedback control and the position count Ncnt–Gcnt are different from each other by the phase lead K1 or K2 of the current supply phase, the rotation direction is determined in the following manner in accordance with a magnitude relationship between the current supply phase determination value Mptn at the end of the feedback control and the position count Ncnt–Gcnt.

If Mptn>(Ncnt–Gcnt), the rotation direction is determined to be normal rotation (i.e., the rotation direction from the P-position to the non-P-position). The routine proceeds to step 533, where the current supply phase determination value Mptn is incremented by 2 to as to effect two-phase current supply.

On the other hand, if Mptn<(Ncnt–Gcnt), the rotation direction is determined to be reverse rotation (i.e., the rotation direction from the non-P-position to the P-position). The routine proceeds to step 534, where the current supply phase determination value Mptn is decremented by 2 to effect two-phase current supply. If Mptn=(Ncnt–Gcnt), it is determined that the rotor 32 is stopped and hence the current supply phase is not changed.

As described above, like the feedback control start position stopping and holding process, the target position stopping and holding process is executed with two-phase current supply which produces higher torque than one-phase current supply does. This makes it possible to prevent the rotor 32 from vibrating in the vicinity of a target position and hence to reliably stop and keep the rotor 32 at the target position.

[Mode-4]

The mode-4 routine shown in FIG. 19, which is a subroutine that is activated at step 507 of the time-synchronous motor control routine of FIG. 16, sets a current supply phase determination value Mptn for a reversing position stopping and holding process in the following manner.

Upon activation of this routine, at step 541, the count CT4 of a current supply time counter that counts the time of a reversing position stopping and holding process. at the next step 542, it is determined whether the time CT4 of the reversing position stopping and holding process has exceeded a prescribed time (e.g., 50 ms).

If the time CT4 of the reversing position stopping and holding process has not exceeded the prescribed time (e.g., 50 ms), the routine proceeds to step 543, where whether the current supply phase is one phase (U-phase, V-phase, or W-phase) is determined on the basis of whether the value Mptn %12 is equal to 2, 3, 6, 7, 10, or 11. If the current supply phase is one phase, steps 544–546 are executed, whereby the current supply phase determination value Mptn is incremented or decremented by 2 in accordance with the rotation direction of the feedback control performed so far and the current supply phase is thereby changed to two phases next to the current one phase. Steps 543–546 are the same as steps 531–534 of the above mode-3 routine of FIG. 18.

As described above, like the feedback control start position stopping and holding process and the target position stopping and holding process, the reversing position stopping and holding process is executed with two-phase current supply which produces higher torque than one-phase current supply does. This makes it possible to prevent the rotor 32 from vibrating in the vicinity of a reversing position and hence to reliably stop the rotor 32 at the reversing position and keep it there.

Then, when the time CT4 of the reversing position stopping and holding process has exceeded the prescribed time (e.g., 50 ms), the determination result at step 542 becomes "yes," whereupon the reversing position stopping and holding process is finished and the feedback control is restarted. First, at step 547, a first current supply phase determination value Mptn for the new feedback control is set by adding or subtracting, in accordance with a rotation direction, a count (e.g., 4 or 3) corresponding to a phase lead of the current supply phase to or from the current supply phase determination value Mptn for the reversing position stopping and holding process, whereupon driving for rotating the rotor 32 is started. Then, the routine proceeds to step 548, where the following settings are made: the feedback permission flag xfb=on (feedback control permitted), the current supply time count CT4=0, and the control mode determination value "mode"=1 (ordinary drive). Then this routine is finished.

[Current Supply Process]

The current supply processing routine shown in FIG. 20 is a subroutine that is activated at step 508 of the time-synchronous motor control routine of FIG. 16. This routine is also activated at step 603 of the feedback control routine (described later) shown in FIG. 22.

Upon activation of the current supply processing routine of FIG. 20, at step 551, it is determined whether the control mode determination value "mode" is equal to "0" (current supply off). If the control mode determination value "mode", is equal to "0" (current supply off), the routine proceeds to step 552, where all the phases are rendered in a current-supply off-state to establish a standby state.

On the other hand, if the determination result at step 551 is "no," the routine proceeds to step 553, where it is determined whether the control mode determination value "mode" is equal to "5" (open-loop control). If the control mode determination value "mode" is equal to "5" (open-loop control), the routine proceeds to step 554, where an open-loop control is performed. In the open-loop control, the rotor 32 is rotated to a target position by setting current supply phases by time-synchronous processing having a cycle of 1 ms, for example, when the encoder 46 has failed or an operation abnormality has occurred in the SR motor 12.

If the determination results at both of steps 551 and 553 are "no," that is, if the control mode determination value "mode" is equal to 1 (feedback control start position stopping and holding process and feedback control), 3 (target position stopping and holding process), or 4 (reversing position stopping and holding process), the routine proceeds to step 555, where a current supply phase is set in accordance with a value Mpt %12 using the conversion table of FIG. 21.

[Feedback Control]

Next, the details of the feedback control routine shown in FIG. 22 will be described. This routine is executed by A and B-phase interruption processing. In this routine, in a state that the feedback control execution conditions are satisfied after the end of an initial drive, the rotor 32 is rotated until its rotation position (Ncnt–Gcnt) reaches a position that is 0.5°, for example, short of a target position (target count Acnt) by switching the current supply phase on the basis of the encoder count Ncnt and an initial positional deviation learned value Gcnt.

Figure 22:
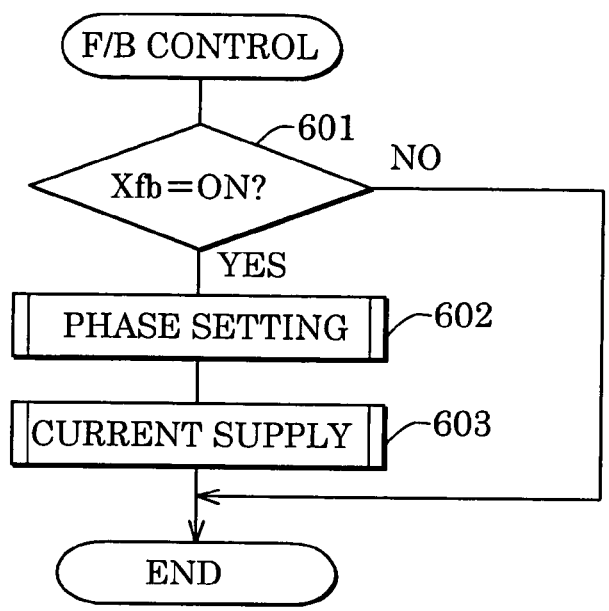
FIG. 22 is a flowchart of a feedback control routine.
Figure 23:
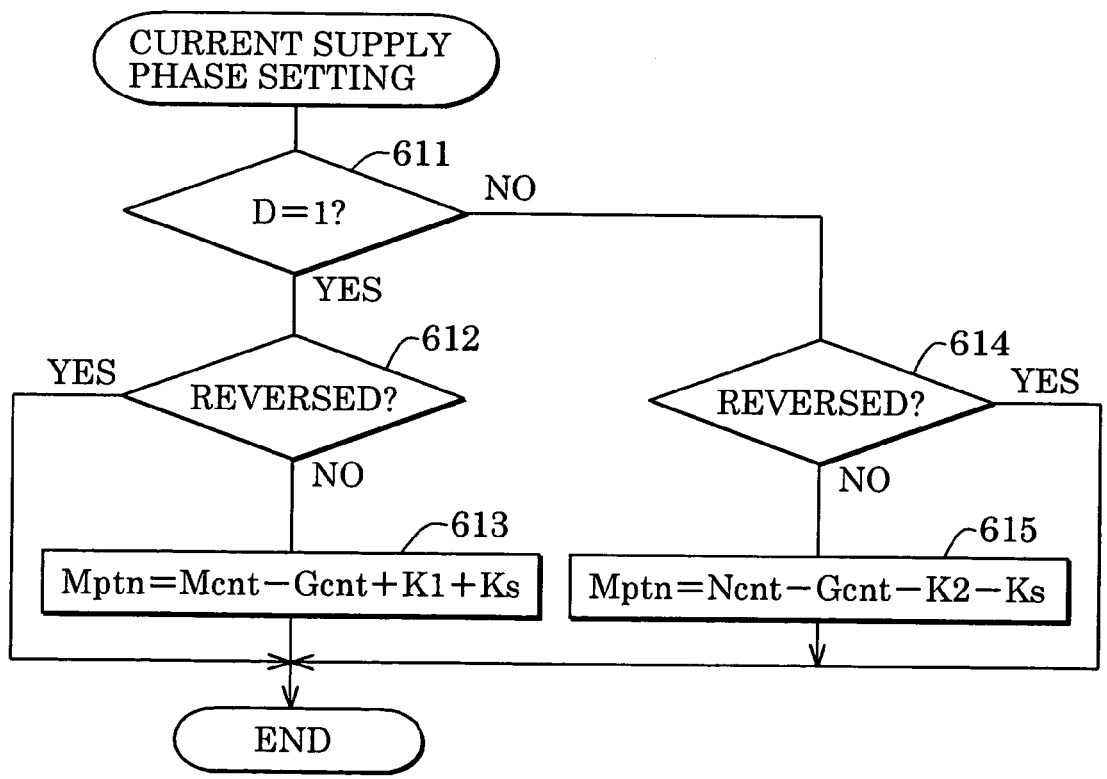
FIG. 23 is a flowchart of a current supply phase setting routine.

Upon activation of the feedback control routine of FIG. 22, at step 601, it is determined whether the feedback permission flag Xfb is "on" (i.e., whether the feedback control execution conditions are satisfied). If the feedback permission flag Xfb is "off" (i.e., the feedback control execution conditions are not satisfied), this routine is finished without executing the remaining steps.

Figure 31:
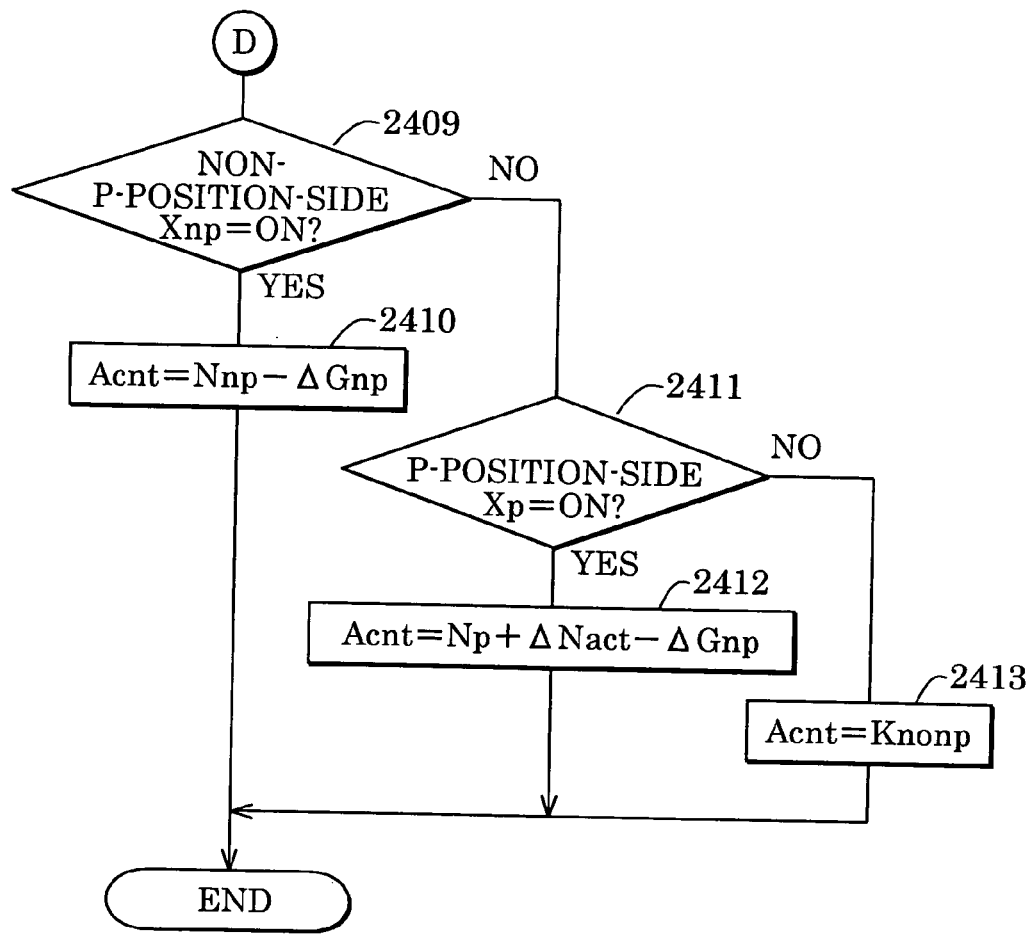

On the other hand, if the feedback permission flag Xfb is "on," the routine proceeds to step 602, where a current supply phase setting routine shown in FIG. 31 is executed, whereby a current supply phase is set on the basis of a current encoder count Ncnt and an initial positional deviation learned value Gcnt. At the next step 603, the current supply processing routine of FIG. 20 is executed.

[Current Supply Phase Setting]

The current supply phase setting routine of FIG. 23 is a subroutine that is activated at step 602 of the feedback control routine of FIG. 22. Upon activation of this routine, at step 611, it is determined whether the rotation direction instruction value D indicating a rotation direction toward a target position is equal to "1" that means the normal rotation direction (i.e., the rotation direction from the P-position to the non-P-position). If it is determined that the rotation direction instruction value D is equal to "1" (normal rotation), the routine proceeds to step 612, where it is determined whether the rotation direction of the rotor 32 has reversed (i.e., whether the encoder count Ncnt has decreased) contrary to the rotation direction instruction. If the rotation direction has not reversed, the routine proceeds to step 613, where the current supply phase determination value Mptn is updated according to the following equation by using a current encoder count Ncnt, an initial positional deviation learned value Gcnt, a normal rotation direction phase lead K1, and a speed phase lead correction amount Ks:

Mptn=Ncnt−Gcnt+K1+Ks

The normal rotation direction phase lead K1 is a phase lead of the current supply phase that is necessary to rotate the rotor 32 in the normal direction (i.e., phase lead of the current supply phase with respect to the current rotation phase of the rotor 32), and is set to "4," for example.

The speed phase lead correction amount Ks is a phase lead correction amount that is set in accordance with a rotation speed of the rotor 32, and is set by a speed phase lead correction amount setting routine. For example, the speed phase lead correction amount Ks is set to "0" in a low speed range and is increased to "1" or "2," for example, as the rotation speed increases. As a result, the current supply phase determination value Mptn is corrected so as to indicate a current supply phase that is suitable for a rotation speed of the rotor 32.

Figure 26:
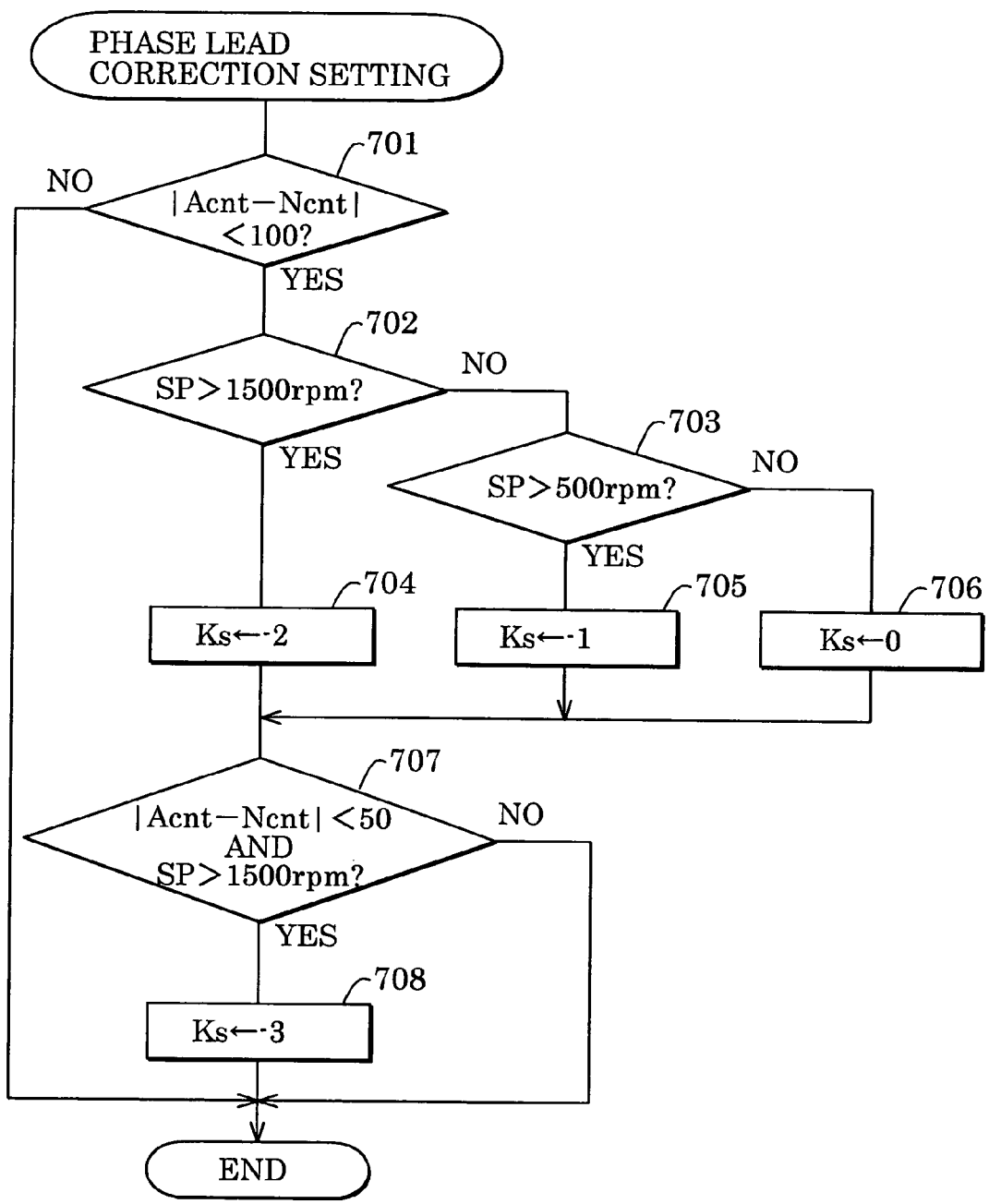
FIG. 26 is a flowchart of a deceleration control speed phase lead correction amount setting routine.

Further, during the feedback control, it changes to the deceleration control when the difference between the rotation position of the rotor 32 (encoder count Ncnt) and the target position (target count Acnt) becomes less than a predetermined value, the speed phase lead correction amount Ks is set based on the rotation speed of the rotor 32 by a deceleration control speed phase lead correction amount setting routine shown in FIG. 26.

On the other hand, if it is determined at step 612 that the rotation direction of the rotor 32 has reversed contrary to the rotation direction instruction, the current supply phase determination value Mptn is not updated to prevent progress of the reversed rotation. In this case, current supply is effected for the phase for which current supply was effected immediately before the reversing (i.e., the preceding current supply phase), whereby braking torque is generated in such a direction as to suppress the reversed rotation.

If it is determined at step 611 that the rotation direction instruction value D is equal to "−1" (the reverse rotation direction, i.e., the rotation direction from the non-P-position to the P-position), the routine proceeds to step 614, where it is determined whether the rotation direction of the rotor 32 has reversed (i.e., whether the encoder count Ncnt has increased) contrary to the rotation direction instruction. If the rotation direction has not reversed, the routine proceeds to step 615, where the current supply phase determination value Mptn is updated according to the following equation by using a current encoder count Ncnt, an initial positional deviation learned value Gcnt, a reverse rotation direction phase lead K2, and a speed phase lead correction amount Ks:

Mptn=Ncnt−Gcnt−K2−Ks

The reverse rotation direction phase lead K2 is a phase lead of the current supply phase that is necessary to rotate the rotor 32 in the reverse direction (i.e., phase lead of the current supply phase with respect to the current rotation phase of the rotor 32), and is set to "3," for example. As in the case of the normal rotation, the speed phase lead correction amount Ks is set by the speed phase lead correction amount setting routine shown in FIG. 26.

On the other hand, if it is determined at step 614 that the rotation direction of the rotor 32 has reversed contrary to the rotation direction instruction, the current supply phase determination value Mptn is not updated to prevent progress of the reversed rotation (i.e., normal rotation). In this case, current supply is effected for the phase for which current supply was effected immediately before the reversing (i.e., the preceding current supply phase), whereby braking torque is generated in such a direction as to suppress the reversed rotation (i.e., normal rotation).

After the current supply phase determination value Mptn has been determined in the above manner, the current supply processing routine of FIG. 20 is executed. While the feedback control is being performed, a current supply phase corresponding to a value Mptn %12 is selected at step 555 by searching the conversion table of FIG. 21 and current supply is effected for the selected current supply phase.

[Rotor Rotation Speed Calculation]

Figure 25:
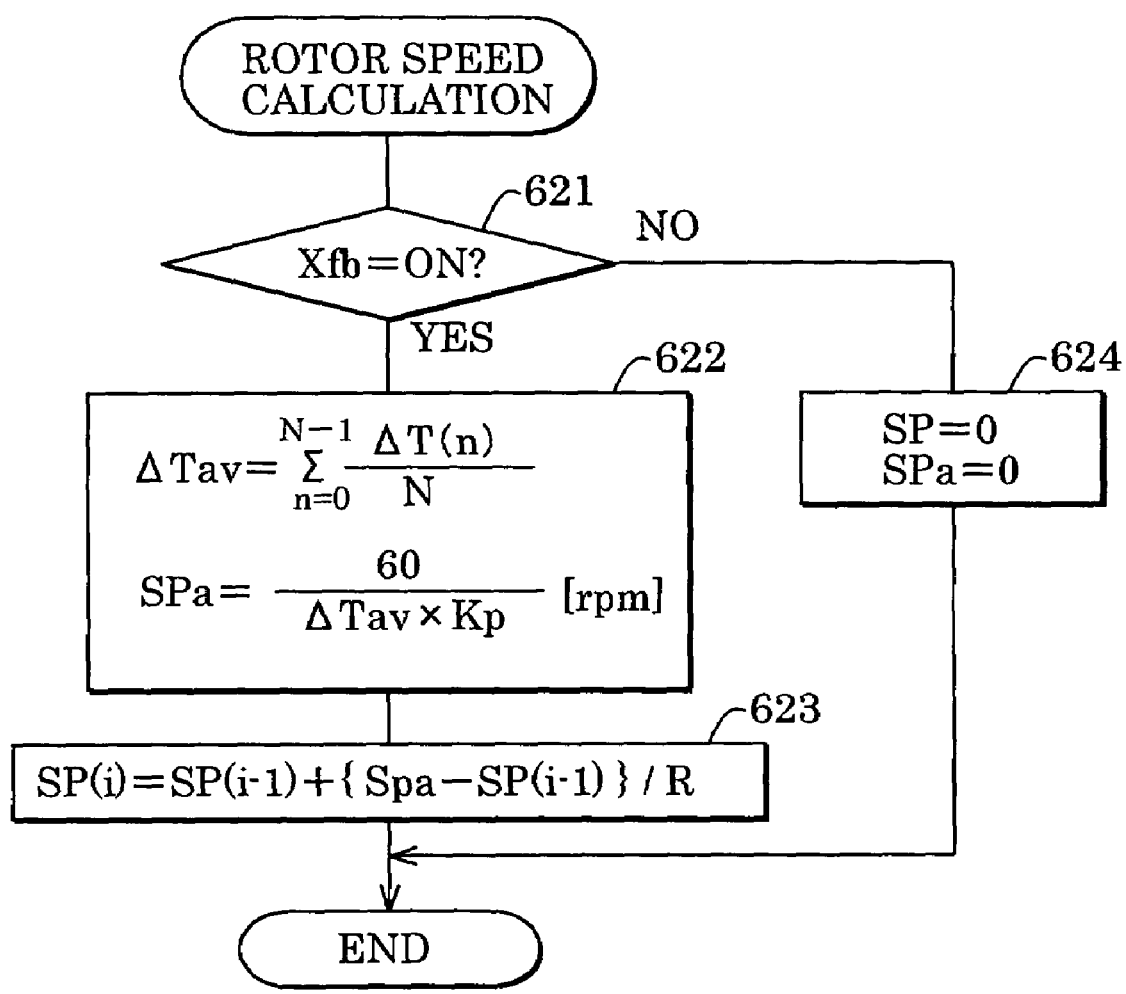
FIG. 25 is a flowchart of a rotor rotation speed calculation routine.

A rotor rotation speed calculation routine shown in FIG. 25, which is executed by A/B-phase interruption processing, calculates a rotation speed SP of the rotor 32 in the following manner. Upon activation of this routine, at step 621, it is determined whether the feedback permission flag Xfb is "on" (a feedback control is being performed). If the feedback permission flag Xfbis "off" (feedback prohibited), no correction is performed on a phase lead of the current supply phase in accordance with a rotation speed SP of the rotor 32 and hence the routine proceeds to step 624, where stored rotation speeds SP and SPa of the rotor 32 are reset. Then this routine is finished.

On the other hand, if the feedback permission flag Xfb is "on" (a feedback control is being performed), a rotation speed SP of the rotor 32 is calculated in the following manner. First, at step 622, time intervals ΔT(n) between rising/trailing edges of an A-phase signal and a B-phase signal of the encoder 46 (i.e., time interval at which the encoder count increases or decreases) are measured and an average of past n time intervals ΔT(n) is calculated. A rotation speed calculation value SPa is calculated according to the following equation:

SPa=60/(ΔTav×Kp)[rpm]

In the above equation, Kp is the number of time intervals ΔT(n) per one rotation of the rotor 32 (i.e., a variation of the encoder count per one rotation of the rotor 32). In the case of the rotor 32 having the structure of FIG. 5, Kp is equal to 96. And ΔTav×Kp is a time [sec] that is required for the rotor 32 to make one rotation.

Then, the routine proceeds to step 623, where a rotation speed SP of the rotor 32 is calculated through smoothing according to the following equation by using the rotation speed calculation value SPa:

SP(i)=SP(i−1)+{SPa−SP(i−1)}/R where SP(i) is a current rotation speed, SP(i−1) is a preceding rotation speed, and R is a smoothing coefficient.

[Speed Phase Lead Correction Amount Setting in Deceleration Control]

A deceleration control speed phase lead correction amount setting routine shown in FIG. 26, which is activated in a prescribed cycle (e.g., every 1 ms), sets a speed phase lead correction amount Ks in accordance with the rotation speed SP of the rotor 32 in the following manner during a deceleration control.

Upon activation of this routine, it is determined at step 701 whether the rotation position of the rotor 32 is close to a target position (i.e., whether it has entered a deceleration control range for stopping the rotor 32) on the basis of whether the absolute value |Acnt−Ncnt| of the difference between a target count Acnt and an encoder count Ncnt is smaller than a prescribed value (e.g., 100). If it is determined that |Acnt−Ncnt| is greater than the prescribed value (i.e., the rotation position of the rotor 32 has not entered the deceleration control range), this routine is finished without executing the remaining steps.

On the other hand, if |Acnt−Ncnt| is smaller than the prescribed value, it is determined that the rotation position of the rotor 32 has entered the deceleration control range, steps 702–706 are executed, whereby the speed phase lead correction amount Ks is set in the following manner according to the rotation speed SP of the rotor 32. First, at steps 702 and 703, it is determined whether the present rotation speed SP of the rotor 32 belongs to a high speed range (e.g., higher than 1,500 rpm), a middle speed range (e.g., 500 to 1,500 rpm), or a low speed range (e.g., lower than 500 rpm). If the present rotation speed SP belongs to the high speed range, the routine proceeds to step 704, where the deceleration control speed phase lead correction amount Ks is set to "−2," for example. If the present rotation speed SP belongs to the middle speed range, the routine proceeds to step 705, where the deceleration control speed phase lead correction amount Ks is set to "−1," for example. If the present rotation speed SP belongs to the low speed range, the routine proceeds to step 706, where the deceleration control speed phase lead correction amount Ks is set to "0," for example. With this measure, in a deceleration control, the absolute value of the speed phase lead correction amount Ks is decreased and the braking force acting on the rotor 32 is weakened as the rotation speed SP of the rotor 32 decreases so as to belong to the high speed range, the middle speed range, and the low speed range in order.

Then, the routine proceeds to step 707, where it is determined whether the deceleration of the rotor 32 is delayed. Specifically, if the rotation speed SP of the rotor 32 belongs to the high speed range even though the absolute value |Acnt−Ncnt| of the difference between the target count Acnt and the encoder count Ncnt is smaller than 50, for example (i.e., the present position of the rotor 32 is very close to the target position), a determination result "the deceleration of the rotor 32 is delayed" is produced and the routine proceeds to step 708. At step 708, the deceleration control speed phase lead correction amount Ks is set to "−3," for example, to maximize the braking force acting on the rotor 32 and thereby lower the rotation speed SP of the rotor 32 rapidly. In this manner, the rotor 32 is prevented from overshooting the target position by its inertia.

In the above first embodiment, when the difference between the rotation position of the rotor 32 (i.e., the encoder count) and a target position (i.e., target count), a transition is made to a deceleration control in which the speed phase lead correction amount Ks for the phase lead of the current supply phase is corrected in accordance with the rotation speed of the rotor 32. In this manner, the braking force acting on the rotor 32 is varied properly in accordance with the rotation speed of the rotor 32, whereby the rotor 32 is decelerated smoothly as it approaches the target position. As a result, the rotor 32 is prevented from overshooting the target position because of its inertia at the end of a feedback control and hence can be stopped accurately at the target position. Both of the rotation speed of the rotor 32 in a feedback control and its stop position accuracy can be increased.

Further, in the deceleration control, the speed phase lead correction amount Ks is set by taking into consideration, in addition to the rotation speed of the rotor 32, the rotation angle from the present rotation position of the rotor 32 to the target position. This measure makes it possible to decelerate the rotor 32 reliably by increasing the braking force that is exerted on the rotor 32 when it approaches the target position even in the case where the deceleration of the rotor 32 is delayed for a certain reason: the rotor 32 can be stopped at the target position accurately.

In addition, the time-synchronous current supply phase setting process in which the current supply phase is set on the basis of the encoder count in a prescribed cycle (e.g., every 1 ms) is executed parallel with a feedback control from the start of the feedback control to arrival of the rotor 32 to a target position. Therefore, even if the rotation of the rotor 32 is stopped for a certain reason during a deceleration control and the encoder 46 comes not to output A-phase and B-phase signals, a current supply phase is set by the time-synchronous current supply phase setting process on the basis of an encoder count at that time point and the rotor 32 can be rotated to a position that is as close to a target position as possible. The reliability of the feedback control (i.e., position switching control) of the SR motor 12 can thus be increased.

The time-synchronous current supply phase setting process is executed over the entire period from the start of a feedback control to arrival of the rotor 32 to a target position. Therefore, with whatever timing the rotor 32 is stopped, the time-synchronous current supply phase setting process makes it possible to set the current supply phase without delay, that is, immediately after a stop of the rotor 32. The stop time of the rotor 32 can thus be shortened.

However, the time-synchronous current supply phase setting process may be executed after the rotation speed of the rotor 32 has become lower than a prescribed value. This provides an advantage that the computation load of the CPU of the ECU 41 can be reduced because it suffices that the time-synchronous current supply phase setting process be executed only after the rotation speed of the rotor 32 has become lower than a value below which the rotor 32 may stop. Alternatively, the time-synchronous current supply phase setting process may be executed only when the rotor 32 stops during a deceleration control. The current supply phase may be set only by a feedback control, that is, without executing a time-synchronous current supply phase setting process.

(Second Embodiment)

In the first embodiment, the rotation amount (of the rotor 32 (i.e., the rotor rotation angle) is converted into the manipulated variable of the position switching mechanism 11 (i.e., the slide length of the parking rod 18) via the rotation transmission system consisting of the speed reducing mechanism 26, the output shaft 13, the detent lever 15, etc. Play exists between the parts constituting the rotation transmission system. For example, backlash exists between the gears of the speed reducing mechanism 26. In a structure in which a connecting portion having a non-circular cross-section that is formed at the tip of the rotary shaft of the motor 12 is fitted into a fitting hole of the output shaft 13, a certain clearance is needed to facilitate the work of fitting the former into the latter.

Figure 27:
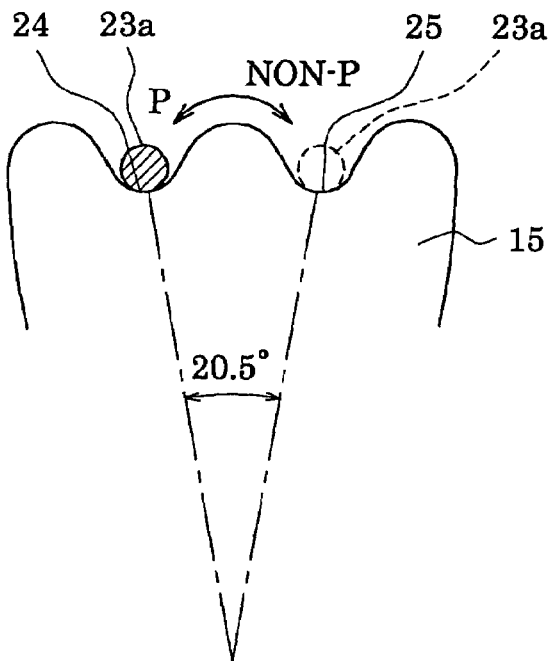
FIG. 27 illustrates a relationship between an engaging portion of a detent spring and each of a P-position holding recess and a non-P-position holding recess of a detent lever in a position switching device according to a second embodiment of the invention.

Further, as shown in FIG. 27, when the engaging portion 23a of the detent spring 23 moves into the P-position holding recess 24 or the non-P-position holding recess 25 of the detent lever 15, a slight gap (i.e., a play amount) exists between the engaging portion 23a and the side walls of the holding recess 24 or 25. As exemplified above, play amounts such as backlash and gaps between the parts exist in the rotation transmission system for converting the rotation amount of the rotor 32 into the manipulated variable (i.e., the slide length of the parking rod 18) of the position switching mechanism 11. Even if the rotation amount of the rotor 32 is controlled correctly on the basis of the encoder count, the manipulated variable of the position switching mechanism 11 has an error corresponding to the play amounts in the rotation transmission system: the manipulated variable of the position switching mechanism 11 cannot be controlled accurately.

Figure 28:
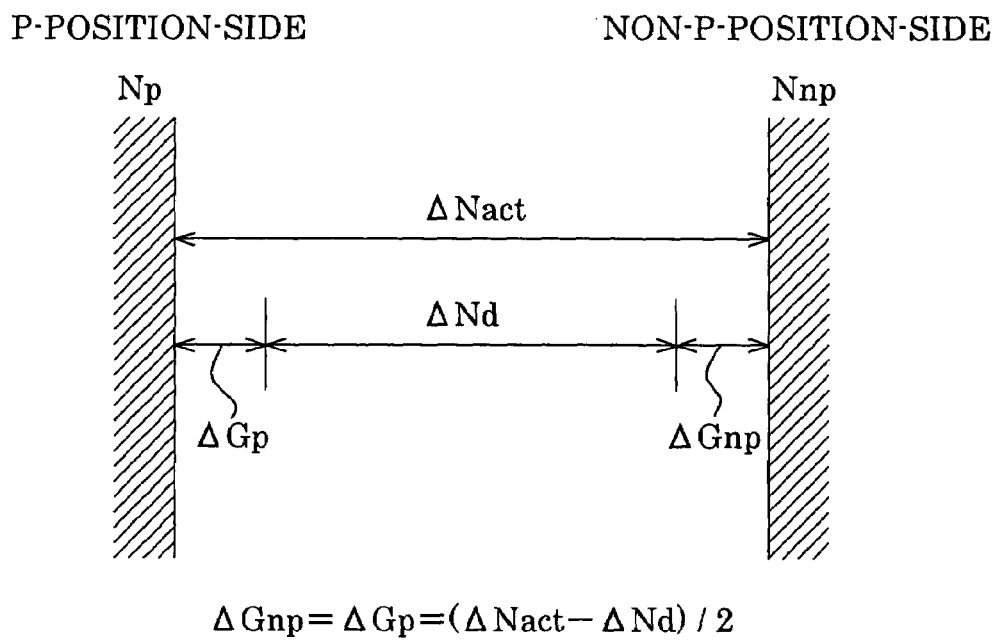
FIG. 28 illustrates a relationship between an actual measurement value and a design value of a rotor movable range and play amounts.

In view of the above, the second embodiment has a function of learning play amounts in the rotation transmission system. Specifically, to learn play amounts in the rotation transmission system, a P-position-side butting control for rotating the rotor 32 until the engaging portion 23a of the detent spring 23 butts against the side wall of the P-position holding recess 24 as a P-position-side limit position of the movable range of the position switching mechanism 11 and a non-P-position-side butting control for rotating the rotor 32 until the engaging portion 23a of the detent spring 23 butts against the side wall of the non-P-position holding recess 25 as a non-P-position-side limit position of the movable range of the position switching mechanism 11 are performed, whereby an increase or decrease of the encoder count corresponding to the range from the P-position-side limit position to the non-P-position-side limit position is determined as an actual measurement value of the movable range of the position switching mechanism 11 (FIGS. 27 and 28).

The difference between this actual measurement value of the movable range and its design value is learned as play amounts of the rotation transmission system. When the rotor 32 is rotated to a target position afterwards, the target position is set by taking the learned play amount of the rotation transmission system into consideration. This makes it possible to set, even if the rotation transmission system has play amounts, a target position taking the play amounts into consideration and to thereby control the manipulated variable of the position switching mechanism 11 accurately.

If there is a sufficient time to learn a play amount (or an operation reference position) of the rotation transmission system from application of power (i.e., turning-on of the ignition switch) to the ECU 41 which controls the SR motor 12 to the start of a control on the position switching mechanism 11, a play amount of the rotation transmission system may be learned after application of power to the ECU 41 and before the start of a control on the position switching mechanism 11 by performing a P-position-side butting control and a non-P-position-side butting control successively. However, where it is necessary to quickly start a control on the position-switching mechanism 11 after application of power to the ECU 41, there may not be a sufficient time to learn a play amount of the rotation transmission system after application of power to the ECU 41.

In view of the above, in this embodiment, after a control on the position-switching mechanism 11 was started without learning a play amount (or operation reference position), in a state that the rotor 32 is stopped at the P-position, a P-position-side butting control is performed and an encoder count when the engaging portion 23a is in contact with the side wall of the P-position holding recess 24 is stored in the RAM of the ECU 41. In a state that the rotor 32 is stopped at the non-P-position, a non-P-position-side butting control is performed and an encoder count when the engaging portion 23a is in contact with the side wall of the non-P-position holding recess 25 is stored in the RAM of the ECU 41. The difference between the encoder counts obtained by the P-position-side butting control and the non-P-position-side butting control is calculated as an actual measurement value of the movable range of the position switching mechanism 11. The difference between the actual measurement value of the movable range and its design value is learned as a play amount of the rotation transmission system.

With this measure, even if there was not a sufficient time to learn a play amount of the rotation transmission system from application of power to the ECU 41 to the start of a control on the position switching mechanism 11 and hence a control on the position switching mechanism 11 was started without learning a play amount of the rotation transmission system, a play amount can be learned by performing butting controls when the rotor 32 is stopped at the P-position and the non-P-position. In this case, the same control as in the other case that does not take a play amount of the rotation transmission system into consideration may be performed before completion of learning of a play amount. Alternatively, the control object may be controlled by using a preset average play amount or a storage value of a preceding learned play amount. In the following description, the abbreviated term "butting control" means either of a P-position-side butting control or a non P-position-side butting control.

Here, after completion of a position switching operation, the current supply to the motor 12 is kept off until the next position switching operation to prevent overheating of the motor 12 and to save the power consumption. During such a current supply off period, the rotor rotation angle of the motor 12 may deviate in the range corresponding to the play in the rotation transmission system. In addition, the magnitude of such a deviation is unknown. For this reason, even if a shift position (i.e., rotor rotation angle) is determined by using an encoder count and a learned value of a play amount of the rotation transmission system in checking an actual shift position in a current supply off period, an erroneous shift position may be obtained due to a deviation in the current supply off period.

As a countermeasure against this problem, in the period when the current supply to the motor 12 is kept off, the P-position/non-P-position switching determination range is set wider than in the period when the current supply to the motor 12 is on. The term "switching determination range" means such a range that if the rotor rotation angle is in that range the engaging portion 23a of the detent spring 23 naturally slides down to the bottom of the position holding recess 24 or 25 of the detent lever 15 due to the spring force of the detent spring 23 and the shift position is kept at the P-position or the non-P position.

In the period when the current supply to the motor 12 is on, the position switching mechanism 11 can be driven in a state that the deviation in the rotor rotation angle due to the play in the rotation transmission system is kept constant by the drive force of the motor 12. Therefore, a position switching control is enabled that is free of influence of the play in the rotation transmission system if a known value for the deviation is obtained by learning or the like. In the period when the current supply to the motor 12 is on, the switching determination range can be set relatively narrow to increase the shift position determination accuracy. However, in the period when the current supply to the motor 12 is kept off, it is unknown to what extent the rotor rotation angle deviates in the range corresponding to the play in the rotation transmission system. Therefore, if the switching determination range is narrow, an erroneous shift position determination tends to occur contrary to the intention.

As a countermeasure, in this embodiment, the switching determination range in the period when the current supply to the motor 12 is kept off is set wider than in the period when the current supply to the motor 12 is on. This makes it possible to determine a shift position more accurately than in the conventional case even in the period when the current supply to the motor 12 is kept off.

The above position switching control is performed by the ECU 41 of the position switching controller 42 according to routines described below. Routines that are executed in addition to the routines according to the first embodiment will be described below.

[Play Amount Learning]

Figure 29:
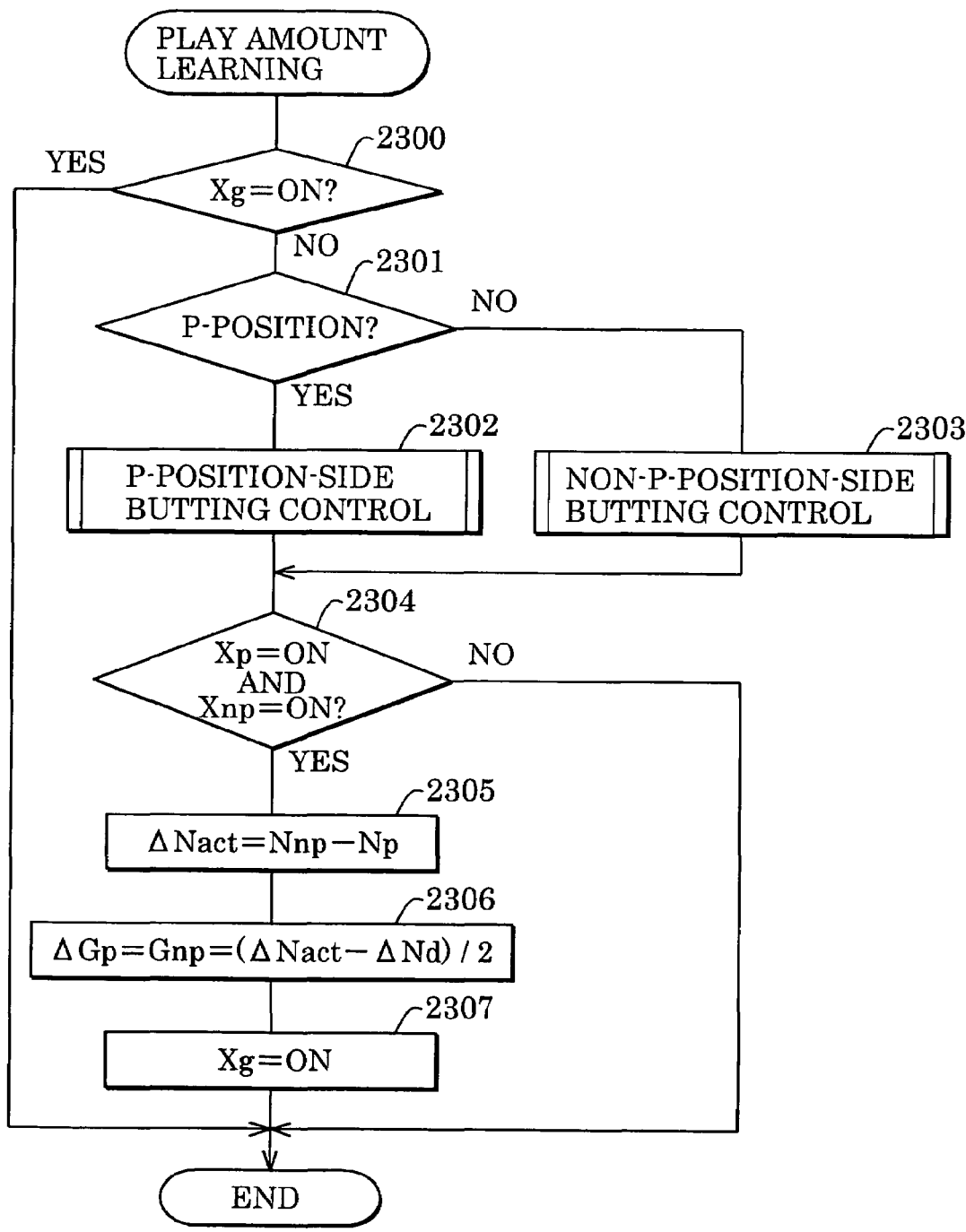
FIG. 29 is a flowchart of a play amount learning routine.

A play amount learning routine shown in FIG. 29 is executed in a prescribed cycle (e.g., every 8 ms) after the end of an initial drive. Upon activation of this routine, it is determined at step 2300 whether a play amount learning completion flag Xg is "on" (play amount learning completed). If the play amount learning completion flag Xg is "on," this routine is finished without executing the remaining steps. As a result, play amount leaning is performed only once in an ignition switch on period. The play amount learning completion flag Xg is set to "off" by an initialization processing routine (not shown) that is executed immediately after the ignition switch is turned on.

On the other hand, if it is determined at step 2300 that the play amount learning completion flag Xg is "off" (play amount learning has not completed), the routine proceeds to step 2301, where it is determined whether the instructed shift position is the P-position. If it is the P-position, the routine proceeds to step 2302, where a P-position-side butting control routine (not shown) is executed in which the rotor 32 is rotated until the engaging portion 23a of the detent spring 23 butts against the side wall of the P-position holding recess 24 that is the P-position-side limit position of the movable range of the position switching mechanism 11. A resulting encoder count Np at the time of P-position-side butting is stored in the RAM of the ECU 41. This P-position-side butting control is performed only once in an ignition switch on period. A P-position-side butting completion flag Xp is set to "on" upon completion of the P-position-side butting control.

If it is determined at step 2301 that the instructed shift position is the non-P-position, the routine proceeds to step 2303, where a non-P-position-side butting control routine (not shown) is executed in which the rotor 32 is rotated until the engaging portion 23a of the detent spring 23 butts against the side wall of the P-position holding recess 24 that is the non-P-position-side limit position of the movable range of the position switching mechanism 11. A resulting encoder count Nnp at the time of non-P-position-side butting is stored in the RAM of the ECU 41. This non-P-position-side butting control is performed only once in an ignition switch on period. A non-P-position-side butting completion flag Xnp is set to "on" upon completion of the non-P-position-side butting control.

Then, the routine proceeds to step 2304, where it is determined whether both of P-position-side and non-P-position-side butting controls have completed (i.e., the P-position-side butting completion flag Xp and the non-P-position-side butting completion flag Xnp are "on"). If at least one of P-position-side and non-P-position-side butting controls has not completed yet, this routine is finished without executing the remaining steps.

On the other hand, if both of P-position-side and non-P-position-side butting controls have completed, the routine proceeds to step 2305, where an actual measurement value ΔNact of the movable range of the rotor 32 (i.e., the movable range of the detent lever 15) from a P-position-side limit position (i.e., the side wall of the P-position holding recess 24) to a non-P-position-side limit position (the side wall of the non-P-position holding recess 25) is calculated according to the following equation:

$$\Delta Nact = Nnp - Np$$

where Nnp is an encoder count at the time of non-P-position-side butting and Np is an encoder count at the time of P-position-side butting.

After the calculation of the actual measurement value ΔNact of the movable range, the routine proceeds to step 2306, where a P-position-side play amount ΔGp and a non-P-position-side play amount ΔGnp are calculated according to the following equation by using the actual measurement value ΔNact and a design value ΔNd of the movable range taking a relationship of FIG. 28 into consideration.

$$\Delta Gp = \Delta Gnp = (\Delta Nact - \Delta Nd)/2$$

The design value ΔNd of the movable range may be calculated in advance on the basis of design data or set to a center value of varied movable ranges in manufacture of mass-production devices (i.e., an actual measurement value of the movable range of a standard device).

As shown in FIG. 28, the difference ΔNact−ΔNd between the actual measurement value ΔNact and the design value ΔNd corresponds to the sum ΔGp+ΔGnp of the P-position-side play amount ΔGp and the non-P-position-side play amount ΔGnp. Since the P-position-side play amount ΔGp and the non-P-position-side play amount ΔGnp generally coincide with each other, each of them can be calculated according to the above equation.

After the calculation of the play amounts ΔGp and ΔGnp, the routine proceeds to step 2307, where the play amount learning completion flag Xg is set to "on" that means completion of play amount learning. Then, the routine is finished.

The actual measurement value ΔNact of the movable range and the play amounts ΔGp and ΔGnp that were calculated at steps 2305 and 2306 are stored, with updating, in a nonvolatile memory (not shown) such as an SRAM of the ECU 41 and the stored values are held even after turning-off of the ignition switch. After the ignition switch is turned on next time, a target count Acnt is set by a target count setting routine shown in FIGS. 30 and 31 by using the actual measurement value ΔNact of the movable range and the play amounts ΔGp and ΔGnp that are stored in the nonvolatile memory of the ECU 41.

[Target Count Setting]

Figure 30:
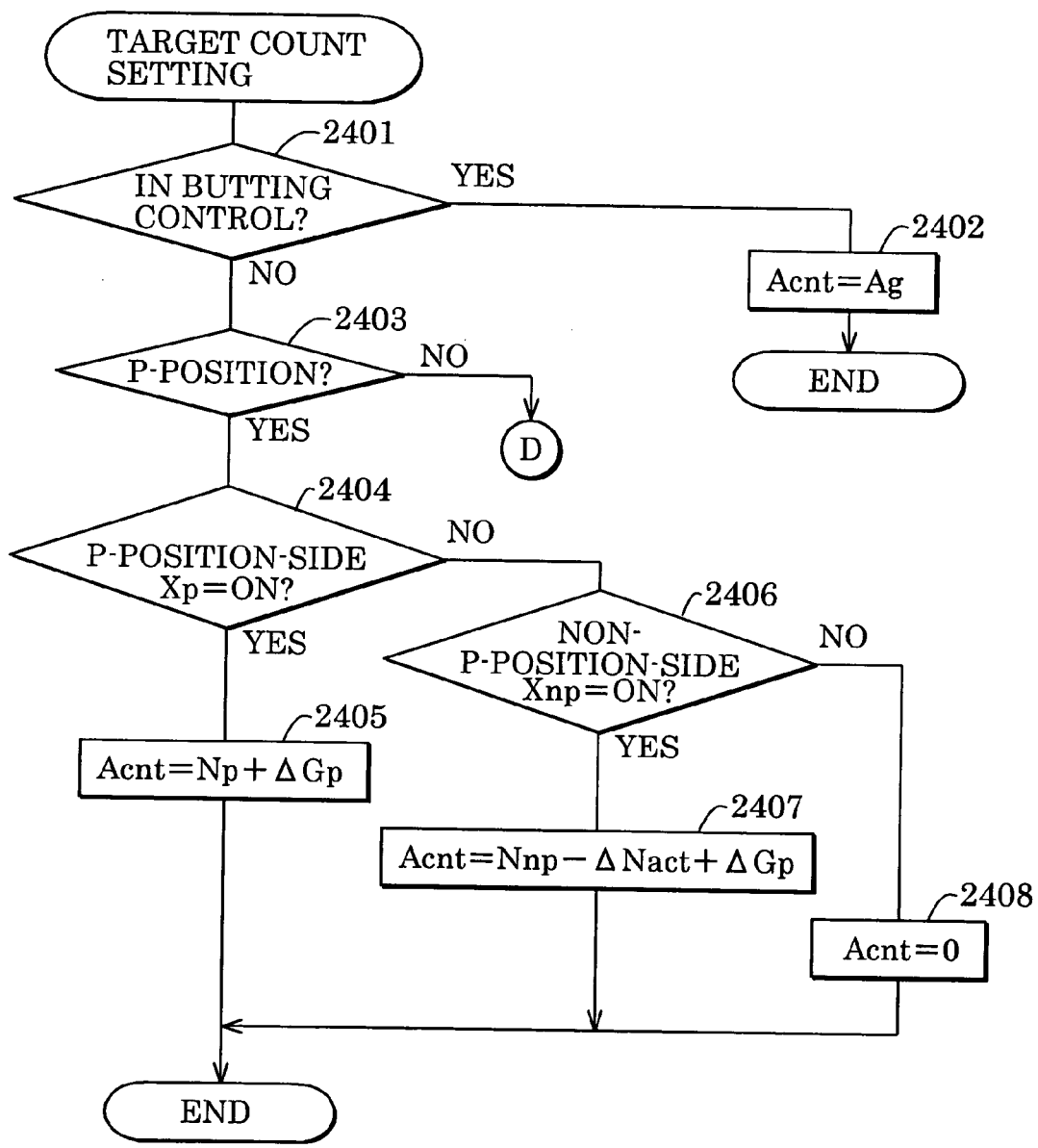
FIGS. 30 and 31 are flowcharts of a target count setting routine.

The target count setting routine shown in FIGS. 30 and 31, which is executed in a prescribed cycle (e.g., every 8 ms) after the end of an initial drive, sets a target count Acnt corresponding to an instructed shift position. Upon activation of this routine, it is determined at step 2401 whether a butting control is being performed. If a butting control is being performed, the routine proceeds to step 2402, where a butting target count Ag is set as a target count Acnt.

On the other hand, if no butting control is being performed, the routine proceeds to step 2403, where it is determined whether an instructed shift position is the P-position. If the instructed shift position is the P-position, the routine proceeds to step 2404, where it is determined whether a P-position-side butting control has completed. If a P-position-side butting control has completed, the routine proceeds to step 2405, where a P-position target count Acnt is is calculated according to the following equation:

$$Acnt = Np + \Delta Gp$$

In this equation, Np is an encoder count at the time of P-position-side butting and ΔGp is a learned value of the P-position-side play amount. A preceding value stored in the nonvolatile memory of the ECU 41 is used as ΔGp until it is updated by a present (i.e., newly calculated) learned value ΔGp of the play amount at step 2306 of the play amount learning routine of FIG. 29.

On the other hand, if a P-position-side butting control has not completed, a determination result "no" is produced at step 2404 and the routine proceeds to step 2406, where it is determined whether a non-P-position-side butting control has completed. If a non-P-position-side butting control has completed, the routine proceeds to step 2407, where a P-position-side target count Acnt is calculated according to the following equation.

$$Acnt = Nnp - \Delta Nact + \Delta Gp$$

In this equation, Nnp is an encoder count at the time of non-P-position-side butting and ΔNact is an actual measurement value of the movable range. A preceding value stored in the nonvolatile memory of the ECU 41 is used as ΔNact until it is updated by a present (i.e., newly calculated) actual measurement value ΔNact at step 2305 of the play amount learning routine of FIG. 29.

If neither a P-position-side butting control nor a non-P-side butting control has completed, the target count Acnt cannot be corrected by using a play amount ΔGp or ΔGnp because neither an encoder count Np at the time of P-position-side butting nor an encoder count Nnp at the time of non-P-position-side butting has been learned. Therefore, in this case, the routine proceeds to step 2408, where a temporary P-position target count "0" is set as a P-position target count Acnt.

On the other hand, if it is determined at step 2403 that the instructed shift position is the non-P-position, the routine proceeds to step 2409 in FIG. 31, where it is determined whether a non-P-position-side butting control has completed. If a non-P-position-side butting control has completed, the routine proceeds to step 2410, where a non-P-position target count is calculated according to the following equation:

$$Acnt = Nnp - \Delta Gnp.$$

In this equation, ΔGnp is a learned value of the non-P-position-side play amount. A preceding value stored in the nonvolatile memory of the ECU 41 is used as ΔGnp until it is updated by a present (i.e., newly calculated) learned value ΔGnp of the play amount at step 2306 of the play amount learning routine of FIG. 29.

On the other hand, if a non-P-position-side butting control has not completed, a determination result "no" is produced at step 2409 and the routine proceeds to step 2411, where it is determined whether a P-position-side butting control has completed. If a P-position-side butting control has completed, the routine proceeds to step 2412, where a non-P-position-side target count Acnt is calculated according to the following equation.

$$Acnt = Np + \Delta Nact - \Delta Gnp$$

If neither a P-position-side butting control nor a non-P-side butting control has completed, the routine proceeds to step 2413, where a temporary non-P-position target count "Knonp" (e.g., a value corresponding to 18.5°) is set as a non-P-position target count Acnt.

In this routine, in setting a target count Acnt, preceding values stored in the nonvolatile memory of the ECU 41 are used as the play amount learned values ΔGp and ΔGnp and the movable range actual measurement values ΔNact until they are updated. Alternatively, a temporary target count (0 or Knonp) may be used until the storage values of the nonvolatile memory are updated.

[Position Determination]

Figure 32:
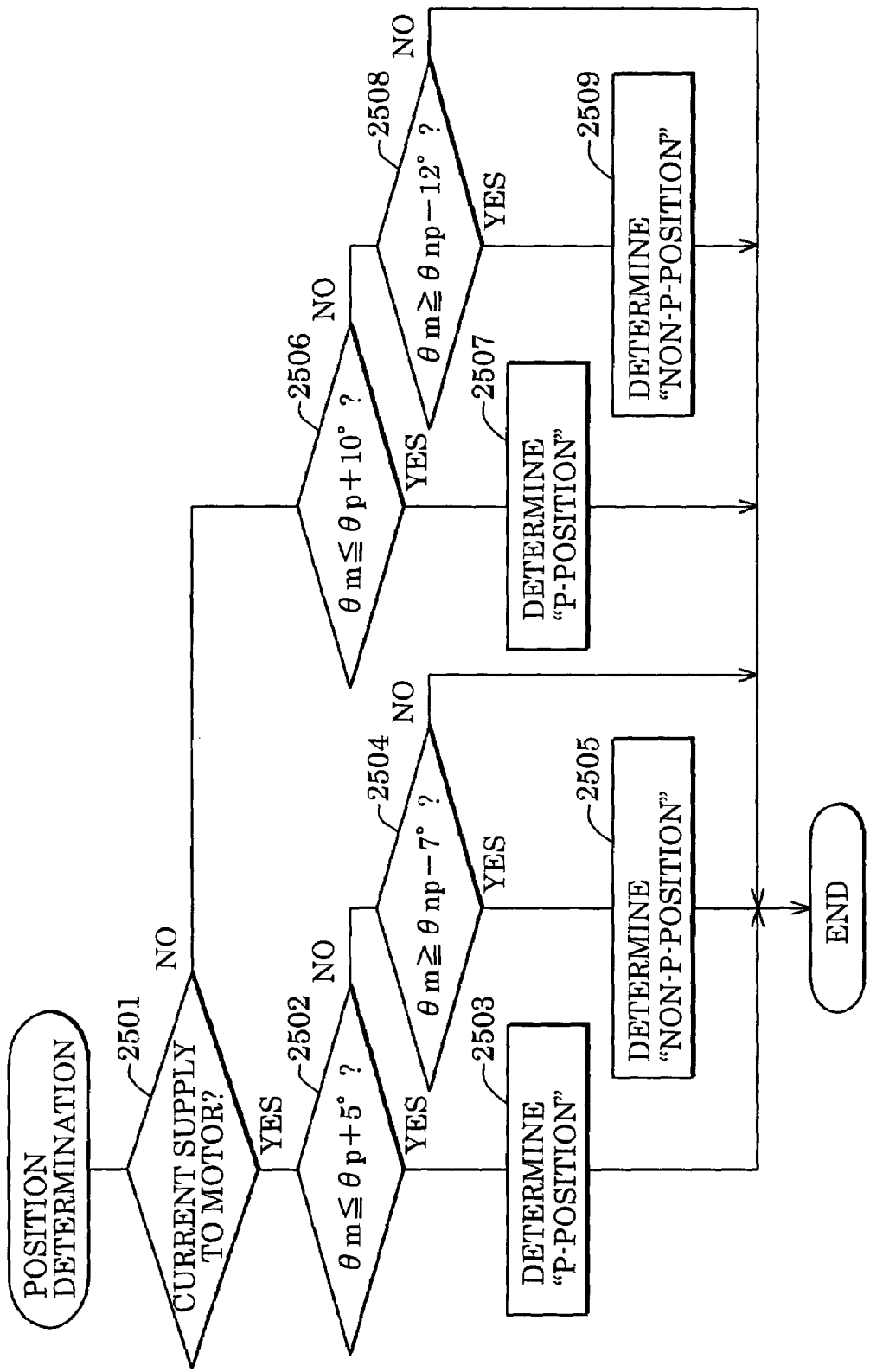
FIG. 32 is a flowchart of a position determination routine.

A position determination routine shown in FIG. 32, which is activated in a prescribed cycle (e.g., every 8 ms) during an ignition switch on period, performs the switching determination and the switching determination position setting. Upon activation of this routine, it is determined at step 2501 whether current supply is being performed to the motor 12. If current supply is being performed, the process proceeds to step 2502, where it is determined whether a present rotor rotation angle θm is within the current-supply-state P-position switching determination range (e.g., within 5° of the P-position-side limit position θp). For example, the width (5°) of the current-supply-state P-position switching determination range may be set by adaptation or the like so as to assure sufficient current-supply-state P-position determination accuracy.

The detection value of the rotor rotation angle θm may be in terms of Ncnt−Gcnt (Ncnt: encoder count; Gcnt: initial positional deviation learned value), and the width (5°) of the P-position switching determination range may be a value as converted into an encoder count.

If it is determined at step 2502 that the present rotor rotation angle θm is within the current-supply-state P-position switching determination range, the routine proceeds to step 2503, where it is determined that the present shift position is the P-position. Then, this routine is finished.

On the other hand, if it is determined at step 2502 that the present rotor rotation angle θm is out of the current-supply-state P-position switching determination range, the routine proceeds to step 2504, where it is determined whether the present rotor rotation angle θm is within the current-supply-state non-P-position switching determination range (e.g., within 7° of the non-P-position-side limit position θnp). For example, the width (7°) of the current-supply-state non-P-position switching determination range may be set by adaptation or the like so as to assure sufficient current-supply-state non-P-position determination accuracy. If it is determined at step 2504 that the present rotor rotation angle θm is within the current-supply-state non-P-position switching determination range, the routine proceeds to step 2505, where it is determined that the present shift position is the non-P-position. Then, this routine is finished.

If a determination result "no" is produced at both steps 2502 and 2504, the present rotor rotation angle θm is regarded as an intermediate position between the P-position and the non-P-position (i.e., in a range where the shift position is indefinite) and this routine is finished.

On the other hand, if it is determined at step 2501 that current supply is not being performed on the motor 12, the routine proceeds to step 2506, where it is determined whether the present rotor rotation angle θm is within the current-supply off-state P-position switching determination range (e.g., within 10° of the P-position-side limit position θp). It is appropriate that the width of the current-supply off-state P-position switching determination range be wider than the current-supply-state one by, for example, the play amount of the rotation transmission system. The increase of the switching determination range may be an adaptation value or a value learned by the play amount learning routine of FIG. 29. The increase of the switching determination range is not limited to the play amount of the rotation transmission system and may be greater or smaller than it. The essential thing is that the increase of the switching determination range be set so as to avoid an erroneous shift position determination during the period when the current supply is kept off.

If it is determined at step 2506 that the present rotor rotation angle θm is within the current-supply off-state P-position switching determination range, the process proceeds to step 2507, where it is determined that the present shift position is the P-position. Then, this routine is finished.

On the other hand, if it is determined at step 2506 that the present rotor rotation angle θm is out of the current-supply off-state P-position switching determination range, the process proceeds to step 2508, where it is determined whether the present rotor rotation angle θm is within the current-supply off-state non-P-position switching determination range (e.g., within 12° of the non-P-position-side limit position θnp). If it is determined at step 2508 that the present rotor rotation angle θm is within the current-supply off-state non-P-position switching determination range, the routine proceeds to step 2509, where it is determined that the present shift position is the non-P-position. Then, this routine is finished.

If a determination result "no" is produced at both steps 2506 and 2508, the present rotor rotation angle θm is regarded as an intermediate position between the P-position and the non-P-position (i.e., in a range where the shift position is indefinite) and this routine is finished.

A shift position that has been determined by this routine is used for a control on an automatic transmission 27 or a fuel injection control, for example.

In the second embodiment, the P-position/non-P-position switching determination range in the period when the current supply to the motor 12 is kept off is set wider than in the period when the current supply to the motor 12 is on. In the period when the current supply to the motor 12 is on, the position switching mechanism 11 can be driven in a state that the deviation in the rotor rotation angle due to the play in the rotation transmission system is kept constant by the drive force of the motor 12. Therefore, a position switching control is enabled that is free of influence of the play in the rotation transmission system if a known value for the deviation is obtained by learning or the like. In the period when the current supply to the motor 12 is on, the switching determination range can be set relatively narrow to increase the shift position determination accuracy.

However, in the period when the current supply to the motor 12 is kept off, it is unknown to what extent the rotor rotation angle deviates in the range corresponding to the play in the rotation transmission system. Therefore, if the switching determination range is narrow, an erroneous shift position determination tends to occur contrary to the intention.

As a countermeasure, the switching determination range in the period when the current supply to the motor 12 is kept off is set wider than in the period when the current supply to the motor 12 is on. This makes it possible to determine a shift position more accurately than in the conventional case even in the period when the current supply to the motor 12 is kept off. Sufficient shift position determination accuracy can be secured even without providing a sensor or the like for detecting the manipulated variable of the position switching mechanism 11, whereby the requirement of cost reduction can be satisfied.

Although in the second embodiment a play amount of the rotation transmission system is learned, an adaptation value may be used for it.

(Third Embodiment)

Next, a motor control according to a third embodiment of the invention will be described by using routines shown in FIGS. 33–35.

[Motor Control]

Figure 33:
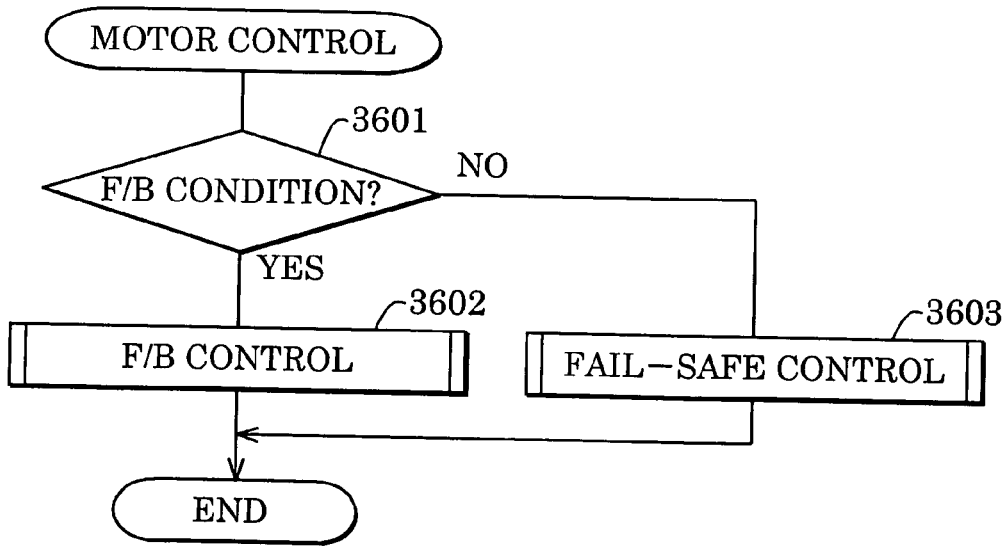
FIG. 33 is a flowchart of a motor control routine according to a third embodiment of the invention.

A motor control routine shown in FIG. 33 is executed in a prescribed cycle during an ignition switch on period. Upon activation of this routine, it is determined at step 3601 whether a feedback control execution condition is satisfied. The feedback control execution condition is satisfied if, for example, both of the following conditions (1) and (2) are met:

(1) an initial drive has finished (i.e., learning of an initial positional deviation learned value Gcnt has finished.

(2) no system failure or abnormality in output pulses of the encoder 46 (e.g., noise, loss of a pulse, a signal line disconnection) is detected.

If both of the two conditions (1) and (2) are met, the feedback control execution condition is satisfied and the routine proceeds to step 3602, where a feedback control is performed. In the feedback control, the rotor 32 is rotated by sequentially switching the current supply phase on the basis of the encoder count by the method described in the first embodiment.

On the other hand, if at least one of the two conditions (1) and (2) is not met, the feedback control execution condition is not satisfied and the routine proceeds from step 3601 to step 3603, where a fail-safe control (i.e., open-loop control) is performed. In the fail-safe control, the rotor 32 is driven to a target rotation angle by rotating the rotor 32 by sequentially switching the current supply phase of the motor 12 by supplying drive signals to the motor drivers 37 and 38 (drive circuits) without feeding back encoder count information while detecting the rotor rotation angle of the motor 12 on the basis of the count of pulses of the drive signals.

[Switching Determination Range Setting]

Figure 34:
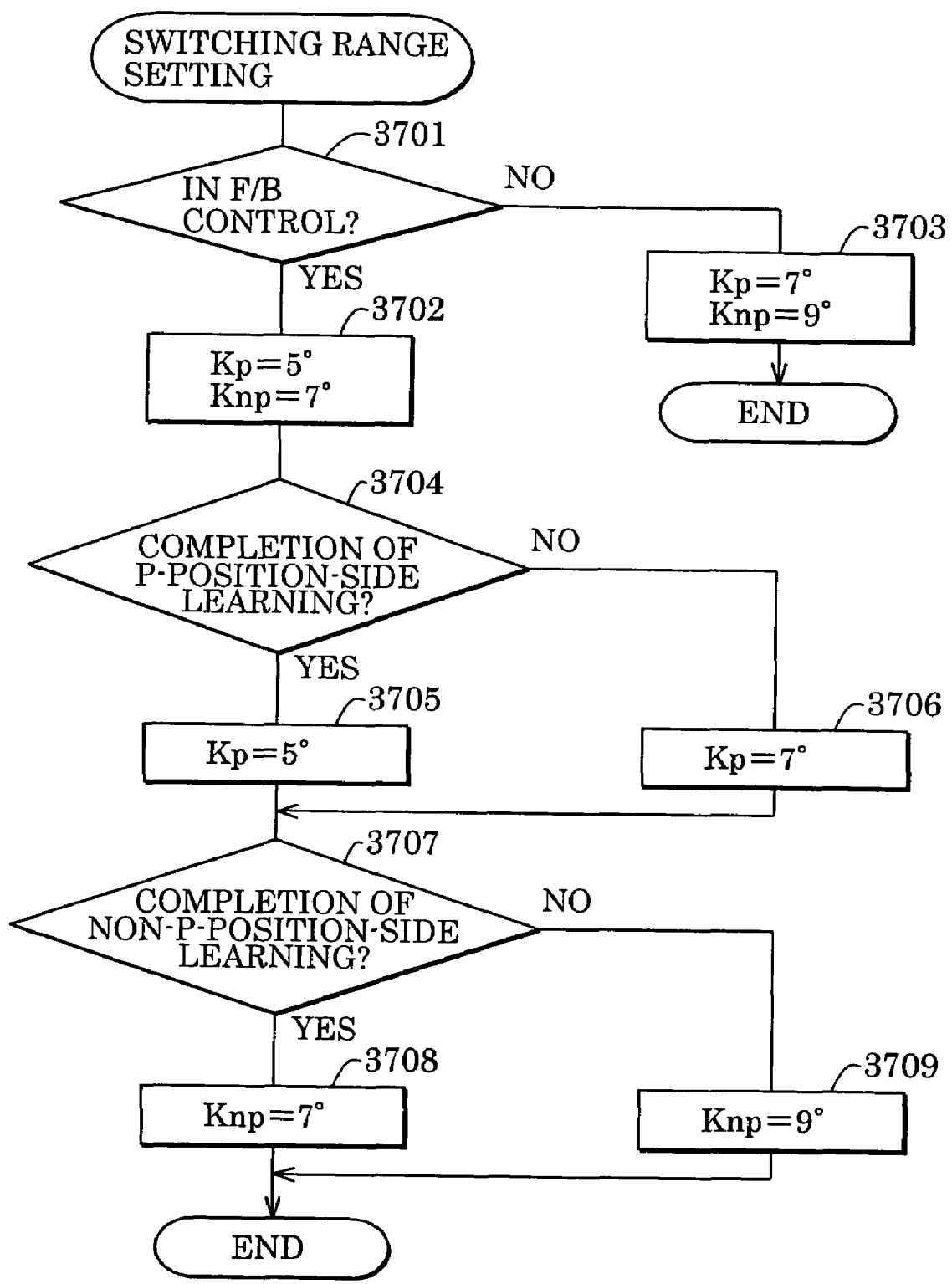
FIG. 34 is a flowchart of a switching determination range setting routine according to the third embodiment.

A switching determination range setting routine shown in FIG. 34 is executed in a prescribed cycle (e.g., every 8 ms) during an ignition switch on period. Upon activation of this routine, it is determined at step 3701 whether a feedback control is being performed. If a feedback control is being performed, the routine proceeds to step 3702, where the widths Kp and Knp of the P-position and non-P-position switching determination ranges are set to 5° and 7°, respectively.

On the other hand, if it is determined at step 3701 that a fail-safe control is being performed, the routine proceeds to step 3703, where the widths Kp and Knp of the P-position and non-P-position switching determination ranges are set to 7° and 9°, respectively, that are greater than in the ordinary case. Then, this routine is finished.

If it is determined at step 3701 that a feedback control is being performed and Kp and Knp are set to 5° and 7°, respectively, the routine proceeds to step 3704, where it is determined whether learning of a P-position-side play amount has completed. If learning of a P-position-side play amount has completed, the routine proceeds to step 3705, where the width Kp of the P-position switching determination range is kept at the ordinary value 5°. However, if learning of a P-position-side play amount has not completed yet, the routine proceeds to step 3706, where the width Kp of the P-position switching determination range is changed to 7° that is greater than the ordinary value.

Then, the routine proceeds to step 3707, where it is determined whether learning of a non-P-position-side play amount has completed. If learning of a non-P-position-side play amount has completed, the routine proceeds to step 3708, where the width Knp of the non-P-position switching determination range is kept at the ordinary value 7°. However, if learning of a non-P-position-side play amount has not completed yet, the routine proceeds to step 3709, where the width Knp of the non-P-position switching determination range is changed to 9° that is greater than the ordinary value.

[Position Determination]

A position determination routine shown in FIG. 35 is executed in a prescribed cycle (e.g., every 8 ms) during an ignition switch on-period. This routine is such that steps 2502 and 2504 of the routine of FIG. 32 according to the second embodiment are changed to steps 2502a and 2504a, respectively.

In this routine, if it is determined at step 2501 that current supply to the motor 12 is being performed, the process proceeds to step 2502a, where it is determined whether a present rotor rotation angle θm is within the current-supply-state P-position switching determination range (e.g., within Kp of the P-position-side limit position θp). The width Kp of the current-supply-state P-position switching determination range is set to a value that has been set by the routine of FIG. 34.

If it is determined at step 2502a that the present rotor rotation angle θm is within the current-supply-state P-position switching determination range, the routine proceeds to step 2503, where it is determined that the present shift position is the P-position.

On the other hand, if it is determined at step 2502a that the present rotor rotation angle θm is out of the current-supply-state P-position switching determination range, the routine proceeds to step 2504a, where it is determined whether the present rotor rotation angle θm is within the current-supply-state non-P-position switching determination range (e.g., within Knp of the non-P-position-side limit position θnp). The width Knp of the current-supply-state non-P-position switching determination range is set to a value that has been set by the routine of FIG. 34.

If it is determined at step 2504a that the present rotor rotation angle θm is within the current-supply-state non-P-position switching determination range, the routine proceeds to step 2505, where it is determined that the present shift position is the non-P-position.

In the third embodiment, the P-position and non-P-position switching determination ranges in the fail-safe control are set wider than in the feedback control. During a fail-safe control, the rotor rotation angle is merely estimated on the basis of the count of drive signals. Therefore, the actual rotor rotation angle may deviate from the estimated value. As a result, during the fail-safe control, an erroneous shift position determination may occur contrary to the intention if the switching determination ranges are narrow.

As a countermeasure, in the third embodiment, the P-position and non-P-position switching determination ranges in the fail-safe control are set wider than in the feedback control. This makes it possible to determine a shift position more accurately than in the conventional case even during the fail-safe control. Sufficient shift position determination accuracy can be secured even without providing a sensor or the like for detecting the manipulated variable of the position switching mechanism 11, whereby the requirement of cost reduction can be satisfied.

Further, in the third embodiment, the switching determination range before learning of a play amount is set wider than that after learning of a play amount. Before learning of a play amount, the play amount is unknown and hence an erroneous shift position determination may occur contrary to the intention if the switching determination range is narrow. As a countermeasure, in the third embodiment, the switching determination range before learning of a play amount is set wider than that after learning of a play amount. This makes it possible to determine a shift position more accurately than in the conventional case even before learning of a play amount. Sufficient shift position determination accuracy can be secured even without providing a sensor or the like for detecting the manipulated variable of the position switching mechanism 11, whereby the requirement of cost reduction can be satisfied.

The encoder is not limited to the magnetic encoder like the encoder 46 used in each of the embodiment and may be an optical encoder or a brush-type encoder, for example. The motor is not limited to the SR motor. A brushless motor other than the SR motor may be used as long as it is of such a type that the motor current supply phase is switched sequentially by detecting the rotation position of the rotor on the basis of the count of an encoder output signal. The position switching device of each of the above embodiments is of such a type that switching is made between two positions, that is, the P-position and the non-P-position. However, for example, the invention can also be applied to a position switching device that switches between positions of P, R, N, D, etc. of an automatic transmission by switching between a position switching valve and a manual valve of the automatic transmission in link with a rotation operation of the detent lever 15.

What is claimed is:

1. A motor control apparatus comprising:
   a motor having a rotor;
   an encoder for producing a pulse signal in synchronism with rotation of the rotor of the motor that rotates a control object; and
   control means for rotating the rotor to a target position by detecting a rotation position of the rotor on the basis of a count of the pulse signal counted by an encoder count by the encoder and sequentially switching a current supply phase of the motor,
   wherein the control means corrects, in a period when a deceleration control is performed on the rotor, a phase lead of the current supply phase with respect to a rotation phase of the rotor in accordance with a rotation speed of the rotor.

2. The motor control apparatus according to claim 1, wherein the control means corrects, in the period when the deceleration control is performed on the rotor, the phase lead of the current supply phase in such a direction that braking force acting on the rotor is weakened as the rotation speed of the rotor lowers.

3. The motor control apparatus according to claim 1, wherein the control means corrects, in the period when the deceleration control is performed on the rotor, the phase lead of the current supply phase taking into consideration, in addition to the rotation speed of the rotor, a rotation angle of the rotor from a present position to the target position.

4. The motor control apparatus according to claim 1, wherein the motor is a switched reluctance motor.

5. The motor control apparatus according to claim 1, wherein the motor drives a position switching mechanism for switching a gear shift position of an automatic transmission of a vehicle.

6. A motor control apparatus comprising:
a motor having a rotor;
an encoder for producing a pulse signal in synchronism with rotation of the rotor of the motor that rotates a control object; and
control means for rotating the rotor to a target position by detecting a rotation position of the rotor on the basis of a count of the pulse signal counted by an encoder count by the encoder and sequentially switching a current supply phase of the motor,
wherein the control means corrects, in a period when a deceleration control is performed on the rotor, a phase lead of the current supply phase with respect to a rotation phase of the rotor in accordance with a rotation speed of the rotor;
wherein the control means includes:
first current supply phase setting means for setting a current supply phase on the basis of the encoder count in synchronism with pulses of the pulse signal of the encoder during a drive control on the motor;
second current supply phase setting means for setting a current supply phase on the basis of the encoder count in a prescribed cycle until the rotor is rotated to the target position,
wherein the control means corrects the phase lead of the current supply phase in accordance with the rotation speed of the rotor when each of the first and second current supply phase setting means sets the current supply phase.

7. A motor control apparatus comprising:
a motor having a rotor;
an encoder for producing a pulse signal in synchronism with rotation of the rotor of the motor that rotates a control object; and
a controller for rotating the rotor to a target position by detecting a rotation position of the rotor on the basis of a count of the pulse signal counted by an encoder count by the encoder and sequentially switching a current supply phase of the motor,
wherein the controller corrects, in a period when a deceleration control is performed on the rotor, a phase lead of the current supply phase with respect to a rotation phase of the rotor in accordance with a rotation speed of the rotor to thereby control generation of a braking force acting electromagnetically on the rotor to decelerate the rotor.

8. The motor control apparatus according to claim 7, wherein the controller corrects, in the period when the deceleration control is performed on the rotor, the phase lead of the current supply phase in such a direction that the braking force acting electromagnetically on the rotor is weakened as the rotation speed of the rotor lowers.

9. The motor control apparatus according to claim 7, wherein the controller corrects, in the period when the deceleration control is performed on the rotor, the phase lead of the current supply phase taking into consideration, in addition to the rotation speed of the rotor, a rotation angle of the rotor from a present position to the target position.

10. The motor control apparatus according to claim 7, wherein the controller includes:
first current supply phase setter for setting a current supply phase on the basis of the encoder count in synchronism with pulses of the pulse signal of the encoder during a drive control on the motor; and
second current supply phase setter for setting a current supply phase on the basis of the encoder count in a prescribed cycle until the rotor is rotated to the target position,
wherein the controller corrects the phase lead of the current supply phase in accordance with the rotation speed of the rotor when each of the first and second current supply phase setter sets the current supply phase.

11. The motor control apparatus according to claim 7, wherein the motor is a switched reluctance motor.

12. The motor control apparatus according to claim 7, wherein the motor drives a position switching mechanism for switching gear shift position of an automatic transmission of a vehicle.

* * * * *

UNITED STATES PATENT AND TRADEMARK OFFICE
CERTIFICATE OF CORRECTION

PATENT NO. : 7,161,314 B2 Page 1 of 1
APPLICATION NO. : 10/674472
DATED : January 9, 2007
INVENTOR(S) : Nakai et al.

It is certified that error appears in the above-identified patent and that said Letters Patent is hereby corrected as shown below:

In the title page, please delete the following:

"Related U.S. Application Data

(62) Division of application No. 09/315,574, filed on May 20, 1999, now Pat. No. 6,512,097, which is a division of application No. 08/665,202, filed on Jun. 13, 1996, now Pat. No. 5,977,322.

(60) Provisional application No. 60/000,238, filed on Jun. 14, 1995, provisional application No. 60/000,250, filed on Jun. 15,1995."

Signed and Sealed this

Twenty-seventh Day of March, 2007

JON W. DUDAS
*Director of the United States Patent and Trademark Office*